(12) United States Patent
Kim et al.

(10) Patent No.: US 8,411,552 B2
(45) Date of Patent: Apr. 2, 2013

(54) CELL SEARCH METHOD IN OFDM CELLULAR SYSTEM, FRAME TRANSMISSION METHOD THEREOF, AND FORWARD LINK FRAME STRUCTURE THEREOF

(75) Inventors: Il-Gyu Kim, Choongcheongbuk-do (KR); Nam-Il Kim, Daejeon (KR); Hyeong-Geun Park, Daejeon (KR); Kap-Seok Chang, Daejeon (KR); Young-Hoon Kim, Daejeon (KR); Seung-Chan Bang, Daejeon (KR)

(73) Assignees: Samsung Electronics Co., Ltd, Suwon-Si (KR); Electronics and Telecommunications Research Institute, Daejeon (KR)

( * ) Notice: Subject to any disclaimer, the term of this patent is extended or adjusted under 35 U.S.C. 154(b) by 986 days.

(21) Appl. No.: 12/093,428

(22) PCT Filed: Nov. 10, 2006

(86) PCT No.: PCT/KR2006/004694
§ 371 (c)(1),
(2), (4) Date: Nov. 18, 2008

(87) PCT Pub. No.: WO2007/055527
PCT Pub. Date: May 18, 2007

(65) Prior Publication Data
US 2009/0067370 A1    Mar. 12, 2009

(30) Foreign Application Priority Data

Nov. 10, 2005  (KR) .......................... 10-2005-0107474
Jan. 18, 2006  (KR) .......................... 10-2006-0005194
May 17, 2006  (KR) .......................... 10-2006-0044259
Nov. 1, 2006   (KR) .......................... 10-2006-0107490

(51) Int. Cl.
*H04J 11/00* (2006.01)

(52) U.S. Cl. ........ 370/208; 370/330; 370/331; 370/350; 375/260; 455/437

(58) Field of Classification Search .................. 370/208, 370/209, 328–334, 350; 375/260; 455/436–444
See application file for complete search history.

(56) References Cited

U.S. PATENT DOCUMENTS 6,865,177 B1 * 3/2005 Park et al. ..................... 370/350
7,170,875 B2 * 1/2007 Tanno et al. .................. 370/335
(Continued)

FOREIGN PATENT DOCUMENTS

JP    2005-198232    7/2005

OTHER PUBLICATIONS

Jin-Woo Lee, et al., "Rapid Cell Search in OFDM-based Cellular Systems" Vehicular Technology Conference, 2005. VTC 2005—Spring, 2005 IEEE 61st vol. 2, pp. 1273-1277.
International Search Report—PCT/KR2006/004694 dated Feb. 9, 2007.
Written Opinion—PCT/KR2006/004694 dated Feb. 9, 2007.

*Primary Examiner* — Christopher Grey
(74) *Attorney, Agent, or Firm* — Kile Park Reed & Houtteman PLLC

(57) ABSTRACT

Provided are a cell search method, a frame transmission method thereof, and a forward link frame structure thereof. The cell search method used by a terminal to search a target cell using reception signals received from a plurality of base stations, each base station transmitting a frame of its cell, in an Orthogonal Frequency-Division Multiplexing (OFDM) cellular system comprising a plurality cells to which a cell-specific scrambling code is assigned includes: detecting a hopping pattern of the target cell using reception sync channel symbols, which are signals corresponding to sync channel symbol positions of the reception signals, wherein the frame of each cell comprises M sync channel symbols code-hopped according to a hopping pattern of the cell, where M is a natural number equal to or greater than 2, each hopping pattern containing M sync channel code sequences and respectively corresponding to each code group to which a scrambling code of each cell belongs, and an arbitrary hopping pattern used in the OFDM cellular system differs from a cyclically shifted result of the hopping pattern, other hopping patterns, or cyclically shifted results of the other hopping patterns; and detecting a code group of the target cell based on the detected hopping pattern. Accordingly, a cell search time and the complexity of the cell search can be reduced.

20 Claims, 28 Drawing Sheets

U.S. PATENT DOCUMENTS

| | | | |
|---|---|---|---|
| 7,203,254 B2 * | 4/2007 | Carsello et al. | 375/334 |
| 7,738,437 B2 * | 6/2010 | Ma et al. | 370/342 |
| 7,889,801 B2 * | 2/2011 | Lindoff | 375/260 |
| 8,155,106 B2 * | 4/2012 | Han et al. | 370/350 |
| 2005/0002369 A1 | 1/2005 | Ro et al. | |
| 2005/0226141 A1 * | 10/2005 | Ro et al. | 370/203 |
| 2008/0095108 A1 * | 4/2008 | Malladi et al. | 370/329 |
| 2009/0080385 A1 * | 3/2009 | Kim et al. | 370/336 |
| 2009/0219882 A1 * | 9/2009 | Kim et al. | 370/330 |

* cited by examiner

Code group 0 = {0, 64, 128, 192, 256, 320, 384, 448}
Code group 1 = {1, 65, 129, 193, 257, 321, 385, 449}
Code group 2 = {2, 66, 130, 194, 258, 322, 286, 450}
⋮    ⋮
Code group 61 = {61, 125, 189, 253, 317, 381, 445, 509}
Code group 62 = {62, 126, 190, 254, 318, 382, 446, 510}
Code group 63 = {63, 127, 191, 255, 319, 383, 447, 511}

FIG. 4

| HOPPING PATTERN | CODE GROUP ID | HOPPING PATTERN | CODE GROUP ID |
|---|---|---|---|
| 5, 6, 7, 8, 9 | 0 | 40, 3, 7, 11, 15 | 32 |
| 10, 11, 12, 13, 14 | 1 | 19, 23, 27, 31, 35 | 33 |
| 15, 16, 17, 18, 19 | 2 | 18, 22, 26, 30, 34 | 34 |
| 20, 21, 22, 23, 24 | 3 | 38, 1, 5, 9, 13 | 35 |
| 25, 26, 27, 28, 29 | 4 | 17, 21, 25, 29, 33 | 36 |
| 30, 31, 32, 33, 34 | 5 | 25, 30, 35, 40, 4 | 37 |
| 1, 3, 5, 7, 40 | 6 | 9, 14, 19, 24, 29 | 38 |
| 36, 39, 1, 30, 33 | 7 | 34, 39, 3, 8, 13 | 39 |
| 34, 37, 40, 2, 5 | 8 | 18, 23, 28, 33, 38 | 40 |
| 6, 10, 14, 39, 2 | 9 | 2, 7, 12, 17, 22 | 41 |
| 7, 13, 30, 36, 1 | 10 | 27, 32, 37, 1, 6 | 42 |
| 37, 2, 19, 25, 31 | 11 | 11, 16, 21, 26, 31 | 43 |
| 8, 14, 20, 26, 32 | 12 | 35, 1, 8, 15, 22 | 44 |
| 3, 9, 15, 21, 38 | 13 | 29, 36, 2, 9, 16 | 45 |
| 27, 33, 39, 4, 10 | 14 | 23, 30, 37, 3, 10 | 46 |
| 22, 28, 34, 40, 16 | 15 | 17, 24, 31, 38, 4 | 47 |
| 17, 23, 29, 5, 11 | 16 | 11, 18, 25, 32, 39 | 48 |
| 33, 4, 38, 9, 21 | 17 | 5, 12, 19, 26, 33 | 49 |
| 39, 32, 3, 15, 27 | 18 | 40, 6, 13, 20, 27 | 50 |
| 21, 35, 8, 34, 7 | 19 | 40, 7, 15, 23, 31 | 51 |
| 10, 12, 14, 16, 18 | 20 | 39, 6, 14, 22, 30 | 52 |
| 20, 22, 24, 26, 28 | 21 | 38, 5, 13, 21, 29 | 53 |
| 30, 32, 34, 36, 38 | 22 | 37, 4, 12, 20, 28 | 54 |
| 9, 11, 13, 15, 17 | 23 | 36, 3, 11, 19, 27 | 55 |
| 19, 21, 23, 25, 27 | 24 | 35, 2, 10, 18, 26 | 56 |
| 29, 31, 33, 35, 37 | 25 | 34, 1, 9, 17, 25 | 57 |
| 15, 18, 21, 24, 27 | 26 | 19, 31, 2, 14, 26 | 58 |
| 4, 7, 10, 13, 16 | 27 | 16, 28, 40, 11, 23 | 59 |
| 19, 22, 25, 28, 31 | 28 | 35, 6, 18, 30, 1 | 60 |
| 8, 11, 14, 17, 20 | 29 | 13, 25, 37, 8, 20 | 61 |
| 23, 26, 29, 32, 35 | 30 | 10, 22, 34, 5, 17 | 62 |
| 20, 24, 28, 32, 36 | 31 | 29, 2, 16, 30, 3 | 63 |

| i-TH CYCLIC SHIFTED HOPPING SEQUENCE | CYCLIC SHIFT INDEX |
|---|---|
| 0 CYCLIC SHIFTED HOPPING SEQUENCE = {5, 6, 7, 8, 9} | 0 |
| 1 CYCLIC SHIFTED HOPPING SEQUENCE = {6, 7, 8, 9, 5} | 1 |
| 2 CYCLIC SHIFTED HOPPING SEQUENCE = {7, 8, 9, 5, 6} | 2 |
| 3 CYCLIC SHIFTED HOPPING SEQUENCE = {8, 9, 5, 6, 7} | 3 |
| 4 CYCLIC SHIFTED HOPPING SEQUENCE = {9, 5, 6, 7, 8} | 4 |

FIG. 30
0TH RECEPTION SYNC
CHANNEL SYMBOL :
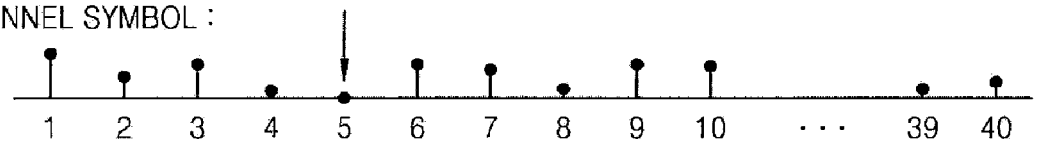
1ST RECEPTION SYNC
CHANNEL SYMBOL :
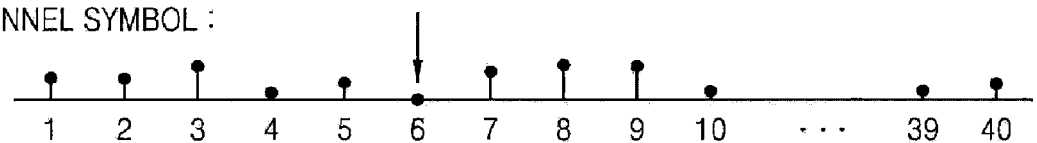
2ND RECEPTION SYNC
CHANNEL SYMBOL :
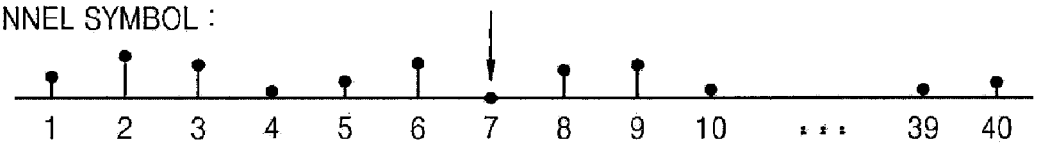
3RD RECEPTION SYNC
CHANNEL SYMBOL :
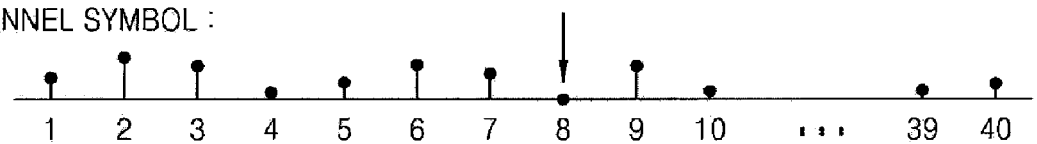
4TH RECEPTION SYNC
CHANNEL SYMBOL :
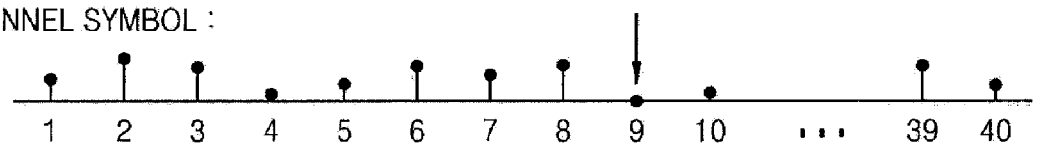

CELL SEARCH METHOD IN OFDM CELLULAR SYSTEM, FRAME TRANSMISSION METHOD THEREOF, AND FORWARD LINK FRAME STRUCTURE THEREOF

CROSS-REFERENCE TO RELATED PATENT APPLICATION

This application claims the benefit of Korean Patent Application Nos. 10-2005-0107474, 10-2006-0005194, 10-2006-0044259, and 10-2006-0107490, respectively filed on Nov. 10, 2005, Jan. 18, 2006, May 17, 2006, and Nov. 1, 2006, in the Korean Intellectual Property Office, the disclosures of which are incorporated herein by reference.

BACKGROUND OF THE INVENTION

1. Field of the Invention

The present invention relates to an Orthogonal Frequency-Division Multiplexing (OFDM) cellular system, and more particularly, to a cell search method in an OFDM cellular system, a frame transmission method thereof, and a forward link frame structure thereof.

2. Description of the Related Art

Wideband Code Division Multiple Access (WCDMA) systems of the $3^{rd}$ Generation Partnership Project (3GPP) use a total of 512 long Pseudo-Noise (PN) scrambling codes in order to identify base stations of a forward link. That is, adjacent base stations in a WCDMA system use a unique long PN scrambling code as a scrambling code of forward link channels. When a mobile station is turned on, the mobile station must acquire system timing of an initial cell and a long PN scrambling code identifier (ID) (it is also called a cell ID) of the initial cell. This process is called a mobile station's cell search process. The initial cell is determined according to a location of the mobile station when the mobile station is turned on, and generally indicates a cell of a base station corresponding to the greatest one of signal components of the base stations, which are included in a forward link reception signal of the mobile station. The system timing indicates slot sync or a frame boundary.

In a WCDMA system, in order to easily perform the mobile station's cell search process, the 512 long PN scrambling codes are grouped into 64 code groups, and a Primary Synchronization Channel (PSC) and a Secondary Synchronization Channel (SSC) are included in a forward link channel. The PSC is used for a mobile station to acquire slot sync, and the SSC is used for the mobile station to acquire a 10-msec frame boundary and a long PN scrambling code group ID.

The mobile station's cell search process in a WCDMA system is accomplished in 3 steps. In the first step, a mobile station acquires slot sync using a PSC. In the WCDMA system, the 10-msec frame includes 15 slots. Each base station transmits a PSC in every 10 msec frame. The same PSC is used for the 15 slots, and all base stations use the same PSC. In the first step, the mobile station acquires slot sync using a matching filter suitable for the PSC.

In the second step, a long PN scrambling code group ID and a 10-msec frame boundary are acquired using the slot sync (i.e., slot timing information) acquired in the first step and a SSC.

In the third step, a long PN scrambling code ID corresponding to a long PN scrambling code used by the initial cell is acquired using a common pilot channel code correlator based on the 10-msec frame boundary and the long PN scrambling code group ID that were acquired in the second step. That is, since 8 long PN scrambling codes are mapped to a single long PN scrambling code group, in the third step, the mobile station calculates a correlation value of each of the 8 long PN scrambling codes and detects the long PN scrambling code ID used in the initial cell based on the calculated result. In WCDMA, a sync channel consists of a PSC and a SSC, and the PSC, the SSC, a common pilot channel, and other data channels are multiplexed in a Code Division Multiplexing (CDM) method based on a time domain direct sequence spread spectrum.

Recently, in the 3GPP, an OFDM-based wireless transmission technology standardization is being established as a part of $3^{rd}$ Generation Long Term Evolution (3G-LTE) to compensate for disadvantages of WCDMA. The sync channel & common pilot channel structure and the mobile station's cell search process used in WCDMA are suitable for Direct Sequence Code Division Multiple Access (DS-CDMA) but cannot be applied to an OFDM forward link. Thus, a forward link sync channel & common pilot channel structure and a mobile station's cell search method are required in an OFDM cellular system.

SUMMARY OF THE INVENTION

The present invention provides a cell search method in which an initial cell search and an adjacent cell search for handover are performed in an Orthogonal Frequency-Division Multiplexing (OFDM) cellular system.

The present invention also provides a frame transmission method for supporting the cell search method.

The present invention also provides a structure of a forward link frame used in the cell search method.

According to an aspect of the present invention, there is provided a cell search method used by a terminal to search a target cell using reception signals received from a plurality of base stations, each base station transmitting a frame of its cell, in an Orthogonal Frequency-Division Multiplexing (OFDM) cellular system comprising a plurality cells to which a cell-specific scrambling code is assigned, the cell search method comprising: detecting a hopping pattern of the target cell using reception sync channel symbols, which are signals corresponding to sync channel symbol positions of the reception signals, wherein the frame of each cell comprises M sync channel symbols code-hopped according to a hopping pattern of the cell, where M is a natural number equal to or greater than 2, each hopping pattern containing M sync channel code sequences and respectively corresponding to each code group to which a scrambling code of each cell belongs, and an arbitrary hopping pattern used in the OFDM cellular system differs from a cyclically shifted result of the hopping pattern, other hopping patterns, or cyclically shifted results of the other hopping patterns; and detecting a code group of the target cell based on the detected hopping pattern.

According to another aspect of the present invention, there is provided a cell search method used by a terminal to search a target cell using reception signals received from a plurality of base stations, each base station transmitting a frame of its cell, in an Orthogonal Frequency-Division Multiplexing (OFDM) cellular system comprising a plurality cells to which a cell-specific scrambling code is assigned, the cell search method comprising: detecting a hopping pattern of the target cell using reception sync channel symbols, which are signals corresponding to sync channel symbol positions of the reception signals, wherein the frame of each cell comprises M sync channel symbols code-hopped according to a hopping pattern of the cell, where M is a natural number equal to or greater than 2, each hopping pattern containing M sync channel code sequences and respectively corresponding to each code group to which a scrambling code of each cell belongs, and an arbitrary hopping pattern used in the OFDM cellular system differs from a cyclically shifted result of the hopping pattern, other hopping patterns, or cyclically shifted results of the other hopping patterns; and detecting a frame boundary based on the detected hopping pattern.

According to another aspect of the present invention, there is provided a cell search method used by a terminal to search a target cell using reception signals received from a plurality of base stations, each base station transmitting a frame of its cell, in an Orthogonal Frequency-Division Multiplexing (OFDM) cellular system comprising a plurality cells to which a cell-specific scrambling code is assigned, the cell search method comprising: detecting a hopping pattern of the target cell using reception sync channel symbols, which are signals corresponding to sync channel symbol positions of the reception signals, wherein the frame of each cell comprises M sync channel symbols code-hopped according to a hopping pattern of the cell, where M is a natural number equal to or greater than 2, each hopping pattern containing M sync channel code sequences and respectively corresponding to a scrambling code of each cell, and an arbitrary hopping pattern used in the OFDM cellular system differs from a cyclically shifted result of the hopping pattern, other hopping patterns, or cyclically shifted results of the other hopping patterns; and detecting a scrambling code of the target cell based on the detected hopping pattern.

According to another aspect of the present invention, there is provided a cell search method used by a terminal to search a target cell using reception signals received from a plurality of base stations, each base station transmitting a frame of its cell, in an Orthogonal Frequency-Division Multiplexing (OFDM) cellular system comprising a plurality cells to which a cell-specific scrambling code is assigned, the cell search method comprising: detecting a hopping pattern of the target cell using reception sync channel symbols, which are signals corresponding to sync channel symbol positions of the reception signals, wherein the frame of each cell comprises M sync channel symbols code-hopped according to a hopping pattern of the cell, where M is a natural number equal to or greater than 2, each hopping pattern containing M sync channel code sequences and respectively corresponding to a scrambling code of each cell, and an arbitrary hopping pattern used in the OFDM cellular system differs from a cyclically shifted result of the hopping pattern, other hopping patterns, or cyclically shifted results of the other hopping patterns; and detecting a frame boundary based on the detected hopping pattern.

According to another aspect of the present invention, there is provided a frame transmission method used by a base station belonging to an arbitrary cell to transmit a frame in an Orthogonal Frequency-Division Multiplexing (OFDM) cellular system comprising a plurality cells to which a cell-specific scrambling code is assigned, the frame transmission method comprising: generating M sync channel code sequences forming a hopping pattern of the cell, where M is a natural number equal to or greater than 2, each hopping pattern containing M sync channel code sequences and respectively corresponding to a scrambling code of each cell or a code group to which the scrambling code belongs; and generating a frame comprising M sync channel symbols code-hopped on a frequency domain using each of the generated M sync channel code sequences and transmitting the generated frame, wherein an arbitrary hopping pattern used in the OFDM cellular system differs from a cyclically shifted result of the hopping pattern, other hopping patterns, or cyclically shifted results of the other hopping patterns.

According to another aspect of the present invention, there is provided an adjacent cell search method used by a terminal to search a target cell using reception signals received from a plurality of base stations, each base station transmitting a frame of its cell, in an Orthogonal Frequency-Division Multiplexing (OFDM) cellular system comprising a plurality cells to which a cell-specific scrambling code is assigned, the adjacent cell search method comprising: acquiring symbol sync and a frame boundary of an adjacent cell by considering symbol sync and a frame boundary of a home cell as the symbol sync and the frame boundary of the adjacent cell, wherein the frame of each cell comprises M sync channel symbols code-hopped according to a hopping pattern of the cell, where M is a natural number equal to or greater than 2, each hopping pattern containing M sync channel code sequences and respectively corresponding to each code group to which a scrambling code of each cell belongs, and an arbitrary hopping pattern used in the OFDM cellular system differs from a cyclically shifted result of the hopping pattern, other hopping patterns, or cyclically shifted results of the other hopping patterns; detecting a hopping pattern of the adjacent cell using reception sync channel symbols, which are signals corresponding to sync channel symbol positions of the reception signals; and detecting a code group of the adjacent cell based on the detected hopping pattern.

According to another aspect of the present invention, there is provided an adjacent cell search method used by a terminal to search a target cell using reception signals received from a plurality of base stations, each base station transmitting a frame of its cell, in an Orthogonal Frequency-Division Multiplexing (OFDM) cellular system comprising a plurality cells to which a cell-specific scrambling code is assigned, the adjacent cell search method comprising: acquiring symbol sync and a frame boundary of an adjacent cell by considering symbol sync and a frame boundary of a home cell as the symbol sync and the frame boundary of the adjacent cell, wherein the frame of each cell comprises M sync channel symbols code-hopped according to a hopping pattern of the cell, where M is a natural number equal to or greater than 2, each hopping pattern containing M sync channel code sequences and respectively corresponding to a scrambling code of each cell, and an arbitrary hopping pattern used in the OFDM cellular system differs from a cyclically shifted result of the hopping pattern, other hopping patterns, or cyclically shifted results of the other hopping patterns; detecting a hopping pattern of the adjacent cell using reception sync channel symbols, which are signals corresponding to sync channel symbol positions of the reception signals; and detecting a scrambling code of the adjacent cell based on the detected hopping pattern.

According to another aspect of the present invention, there is provided a structure of a forward link frame transmitted by a base station belonging to an arbitrary cell in an Orthogonal Frequency-Division Multiplexing (OFDM) cellular system comprising a plurality cells to which a cell-specific scrambling code is assigned, the forward link frame comprising M sync channel symbols sequence-hopped according to a hopping pattern of the cell, where M is a natural number equal to or greater than 2, each hopping pattern containing M sync channel code sequences and respectively corresponding to a scrambling code of each cell or a code group to which the scrambling code belongs, wherein an arbitrary hopping pattern used in the OFDM cellular system differs from a cyclically shifted result of the hopping pattern, other hopping patterns, or cyclically shifted results of the other hopping patterns.

BRIEF DESCRIPTION OF THE DRAWINGS

The above and other features and advantages of the present invention will become more apparent by describing in detail exemplary embodiments thereof with reference to the attached drawings in which:

FIG. 4 illustrates a hopping code according to an embodiment of the present invention;

FIGS. 29 and 30 are diagrams for explaining an operation of a home cell component canceller illustrated in FIG. 28, according to an embodiment of the present invention;

DETAILED DESCRIPTION OF THE INVENTION

Figure 1:
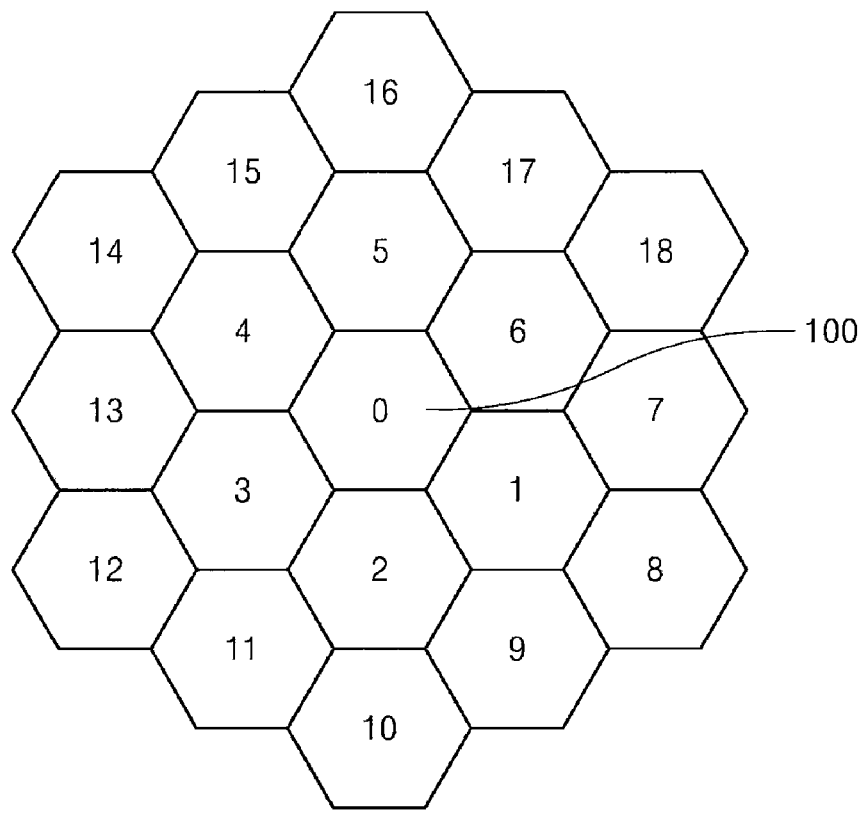
FIG. 1 a conceptual diagram for explaining how to group scrambling codes according to an embodiment of the present invention.

The present invention will now be described more fully with reference to the accompanying drawings, in which exemplary embodiments of the invention are shown.

The present invention relates to a method of searching a target cell using a hopping pattern. The target cell search process is divided into an initial cell search process and an adjacent cell search process to allow handover to occur. In the present specification, it is assumed that the target cell is an initial cell, however, it will be understood by those of ordinary skill in the art that the present invention can also be applied to the adjacent cell search process. In addition, in the present specification, an embodiment of a method of efficiently searching an adjacent cell when the cell search method is applied to an Orthogonal Frequency-Division Multiplexing (OFDM) cellular system operating in a base station sync mode is also suggested.

In general, each base station of an OFDM cellular system scrambles OFDM symbols using a long PN scrambling code. However, since the base station can use another scrambling code instead of the long PN scrambling code, any code used to scramble OFDM symbols is hereinafter called a scrambling code for convenience of description.

Though it is assumed in the present specification for convenience of description that each of the base stations includes 2 transmission antennas to describe several transmission diversity schemes, it will be understood by those of ordinary skill in the art that the present invention can be applied to all base stations regardless of the number of transmission antennas and transmission diversity schemes to be used are not limited to the several transmission diversity schemes.

Though it is assumed in the present specification for convenience of description that the mobile station includes 2 reception antennas to describe a reception diversity scheme using a simple summing method as a data combining method, it will be understood by those of ordinary skill in the art that the present invention can be applied to all mobile stations regardless of the number of reception antennas and a reception diversity scheme and a data combining method to be used are not limited to the described reception diversity scheme and the simple summing method.

In the present specification, an OFDM symbol related to a sync channel is called a sync channel symbol for convenience of description. An example of the sync channel symbol is an OFDM symbol including each sync channel chip forming a sync channel code sequence. Each sync channel chip is used as a Fourier coefficient in a subcarrier frequency of a frequency band occupied by the sync channel. That is, the sync channel code sequence indicates a sequence formed with sync channel chips respectively mapped to subcarriers of the sync channel symbol. The sync channel may exist in a hierarchical structure including a Primary Synchronization Channel (PSC) and a Secondary Synchronization Channel (SSC) or in a non-hierarchical structure including a single sync channel. In the case of the hierarchical structure, a PSC code sequence indicates a sequence formed with PSC chips respectively mapped to subcarriers of a PSC symbol, and an SSC code sequence indicates a sequence formed with SSC chips respectively mapped to subcarriers of an SSC symbol. In the hierarchical structure, an OFDM symbol including PSC chips and an OFDM symbol including SSC chips may separately exist by performing Time Division Multiplexing (TDM) of the PSC and the SSC, and an OFDM symbol including both PSC chips and SSC chips may exist by performing Frequency Division Multiplexing (FDM) of the PSC and the SSC.

In the present specification, for convenience of description, for the former case, the OFDM symbol including PSC chips is called a PSC symbol, and the OFDM symbol including SSC chips is called an SSC symbol, and for the latter case, the OFDM symbol including both PSC chips and SSC chips is called a sync channel symbol.

The present invention relates to a method of performing a cell search including symbol sync acquisition, frame boundary detection, and scrambling code detection, and is divided into an embodiment A in which the cell search is performed using each hopping pattern respectively corresponding to each code group to which a scrambling code belongs and an embodiment B in which the cell search is performed using each hopping pattern respectively corresponding to each a scrambling code.

According to the embodiment A of the present invention, symbol sync is acquired in a first detection step, a code group and a frame boundary are detected using a hopping pattern in a second detection step, and a scrambling code is detected using a pilot correlation in a third detection step.

The embodiment B of the present invention is divided into an embodiment B-1, which comprises a first detection step in which symbol sync is acquired and a second detection step in which a code group and a frame boundary are detected using a hopping pattern, and an embodiment B-2 comprising the first detection step, the second detection step, and a third detection step in which a detection result of the first detection step and a detection result of the second detection step are verified using a pilot correlation. According to the embodiment A of the present invention, since a mobile station uses only scrambling codes belonging to the code group detected in the second detection step to detect a scrambling code, complexity in the scrambling code detection can be reduced. In addition, according to the embodiment B-1 of the present invention, a quick cell search can be performed, and according to the embodiment B-2 of the present invention, since verification is performed, a cell search more reliable than the embodiment B-1 of the present invention can be performed.

The embodiments A, B-1, and B-2 of the present invention are commonly related to a sync channel design for the second detection step, and another embodiment of the present invention suggests a sync channel in a non-hierarchical structure in which a sync channel to which a hopping pattern used in the second detection step is applied can be used to acquire symbol sync in the first detection step. That is, this embodiment suggests a method of performing both the first detection step and the second detection step using a single type of sync channel symbol.

However, the second detection step in the embodiments A, B-1, and B-2 of the present invention can be applied to "a sync channel in a hierarchical structure" since an SSC of the hierarchical structure and a sync channel of the non-hierarchical structure use a hopping pattern. That is, a difference between the two structures is that a PSC is used in the first detection step in the hierarchical structure whereas a sync channel used in the second detection step is used in the first detection step in the non-hierarchical structure.

The term 'symbol sync acquisition' will be used in the present specification as a comprehensive term for sync channel symbol timing detection, sync slot timing detection, and sync slot boundary detection. That is, since a sync slot is established based on a sync channel symbol (in the case of the non-hierarchical structure) or a PSC symbol (in the case of the hierarchical structure), sync channel symbol timing is equivalent to sync slot timing. In addition, since an SSC symbol (in the case of separately existing from the PSC symbol in the hierarchical structure) generally exists at a predetermined position in the sync slot, the sync slot timing detection indicates that a position of an OFDM symbol in which a PSC and an SSC exist in the sync slot has been detected. The term 'symbol sync information' will be used in the present specification as a comprehensive term for information on sync channel symbol timing, information on sync slot timing, and information on a sync slot boundary.

The term 'frame boundary detection' will be used in the present specification as a comprehensive term for frame boundary timing detection. The term 'frame boundary information' will be used in the present specification as a comprehensive term for information on frame boundary timing.

The term 'code group detection' will be used in the present specification as a comprehensive term for code group identifier detection and code group detection, and the term 'code group information' will be used in the present specification as a comprehensive term for a code group identifier and a code group. The term 'scrambling code detection' will be used in the present specification as a comprehensive term for scrambling code identifier detection and scrambling code detection, and the term 'scrambling code information' will be used in the present specification as a comprehensive term for a scrambling code identifier and a scrambling code.

The term 'Fourier transform' will be used for convenience of description in the present specification as a comprehensive term for discrete Fourier transform and fast Fourier transform.

FIG. 1 is a conceptual diagram for explaining how to group scrambling codes according to an embodiment of the present invention.

A scrambling code or scrambling code ID 100 used to scramble common pilot channel symbols or data channel symbols is assigned to each base station belonging to an OFDM cellular system. In particular, according to the current embodiment, the number of scrambling codes used in the OFDM cellular system is 512, wherein $N_c=8$ scrambling codes form a single code group. That is, according to the current embodiment, 64 code groups exist in the OFDM cellular system. Reference numeral 102 denotes a code group ID. The code group ID 102 corresponds to a cell group ID, and the scrambling code ID 100 corresponds to a cell ID.

The above-described embodiment A is an embodiment in which the number of scrambling codes included in a code group is more than 2, and the above-described embodiment B is an embodiment in which a grouping process of scrambling codes is not performed, in other words, the number of scrambling codes included in a code group is 1.

Figure 2:
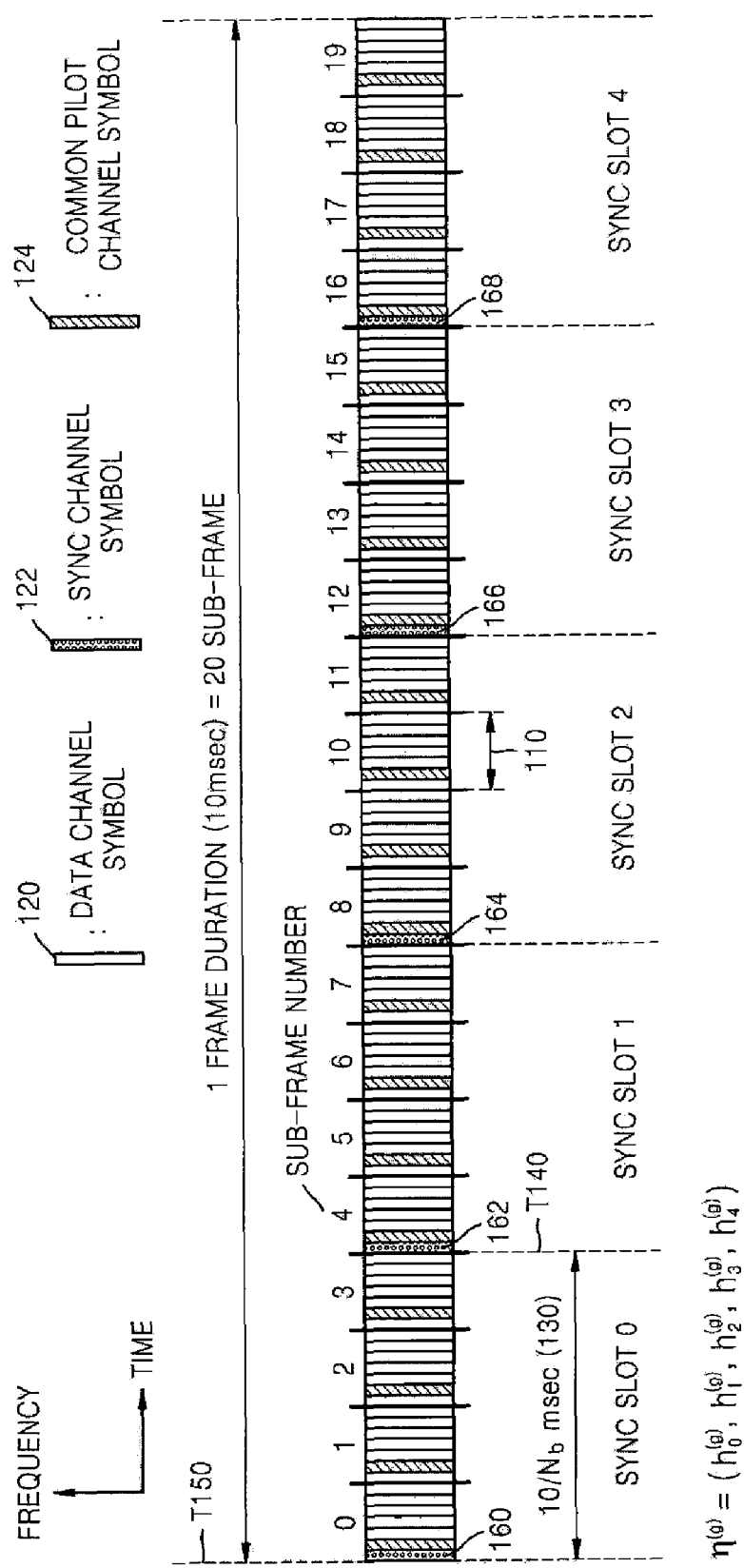
FIG. 2 is illustrates a structure of a forward link frame according to an embodiment of the present invention.

FIG. 2 illustrates a structure of a forward link frame according to an embodiment of the present invention.

Referring to FIG. 2, the forward link frame has a 10-msec duration and includes 20 sub-frames 110, each sub-frame having a 0.5-msec duration. In FIG. 2, the horizontal axis represents time, and the vertical axis represents frequency (OFDM subcarrier).

In the current embodiment, each sub-frame 110 includes 7 OFDM symbols 120. However, it will be understood by those of ordinary skill in the art that the number of OFDM symbols per sub-frame can vary according to a used system and a supporting service. For example, in a sub-frame structure providing a Multimedia Broadcast Multicast Service (MBMS), each sub-frame includes 6 OFDM symbols, and in this case, the length of a cyclic prefix is greater than that in the case where the number of OFDM symbols per sub-frame is 7. The number of types of OFDM symbols illustrated in FIG. 2 is 3, i.e., a data channel symbol 120, a sync channel symbol 122, and a common pilot channel symbol 124. The sync channel symbol 122 is the same as described above, and the common pilot channel symbol 124 is an OFDM symbol including a pilot symbol and related to a common pilot channel, and the data channel symbol 120 is an OFDM symbol not related to a sync channel or a common pilot channel. Referring to FIG. 2, each sub-frame 110 includes one common pilot channel symbol 124, wherein some sub-frames 110 include a single sync channel symbol 122 and the others include no sync channel symbol 122.

The common pilot channel is used to estimate a channel for coherent demodulation of a data channel of a forward link and also used for the third detection step according to an embodiment of the present invention.

In the current embodiment, a single sync channel symbol 122 exists at every 4 sub-frames 110, and thus a total of 5 sync channel symbols 122 exist in the forward link frame (10 msec duration). In the present specification, a group of 4 sub-frames 110, which corresponds to a time interval 130 between sync channel symbols 122, is called a sync slot. That is, according to the current embodiment, the number $N_b$ of sync slots in a single frame is 5, and each sync channel symbol 122 has the same relative position in a corresponding sync slot. Reference numeral T140 is related to sync slot timing detected in the first detection step, and reference numeral T150 is related to frame boundary timing detected in the second detection step.

Though the sync channel symbol 122 is located in the first OFDM symbol of a sub-frame 110 in the current embodiment, the position of the sync channel symbol 122 is not limited to this but can be located in any OFDM symbol of the sub-frame 110. However, for easiness of sync acquisition and an increase of sync acquisition performance, it is preferable that the position of each sync channel symbol 122 in every sync slot is the same. That is, it is preferable that an interval between adjacent sync channel symbols 122 is constant. In addition, as described above, in order to support both a service in which the number of OFDM symbols per sub-frame is 6 and a service in which the number of OFDM symbols per sub-frame is 7, it is preferable that the position of each sync channel symbol 122 is the far end of a corresponding sub-frame since a cell search can be performed regardless of the length of a cyclic prefix.

The OFDM symbols that remain due to the exclusion of the sync channel symbols 122, i.e., the data channel symbols 120 and the common pilot channel symbols 124, are scrambled with a cell-specific scrambling code in order to identify each cell. That is, data symbols or pilot symbols multiplied by a cell-specific scrambling code in a frequency domain are carried on subcarriers of the remaining OFDM symbols.

In the present specification, each of a sync channel symbol, a common pilot channel symbol, and a data channel symbol is called an OFDM symbol transmitted from each base station, a reception sync channel symbol a reception common pilot channel symbol, and a reception data channel symbol are respectively used as terms indicating a reception signal at a sync channel symbol position, a reception signal at a common pilot channel symbol position, and a reception signal at a data channel symbol position among reception signals of a mobile station. The mobile station acquires information on the sync channel symbol position in the first detection step and acquires information on the common pilot channel symbol position and information on the data channel symbol position in the second detection step in which a frame boundary is detected. However, it will be understood by those of ordinary skill in the art that a forward link frame structure in which the information on the common pilot channel symbol position and the information on the data channel symbol position can also be acquired in the first detection step can be designed.

A forward link frame transmitted from a base station belonging to an arbitrary cell according to an embodiment of the present invention includes M sync channel symbols code-hopped according to a hopping pattern of the cell, where M is a natural number equal to or greater than 2.

According to the current embodiment, M=5. In FIG. 2, '$h^{(g)}=(h_0^{(g)}, h_1^{(g)}, h_2^{(g)}, h_3^{(g)}, h_4^{(g)})$' indicates a hopping pattern, i.e., a hopping sequence, and g indicates a hopping pattern ID, i.e., a hopping sequence ID. In the current embodiment, the hopping pattern $h^{(g)}$ is made up of 5 sync channel code sequence indexes $h_0^{(g)}, h_1^{(g)}, h_2^{(g)}, h_3^{(g)}, h_4^{(g)}$. That is, $h_n^{(g)}$, indicates a sync channel code sequence index, which is an n-th element of the hopping pattern $h^{(g)}$. A scheme using the characteristic that sync channel code sequences in a single frame are different from each other in every sync slot is called code hopping.

In FIG. 2, the sync channel symbol 122 at the position of reference numeral 160 includes a sync channel code sequence corresponding to the sync channel code sequence index $h_0^{(g)}$, and the sync channel symbols 122 at the positions of reference numerals 162, 164, 166, and 168 respectively include a sync channel code sequence corresponding to the sync channel code sequence indexes $h_1^{(g)}, h_2^{(g)}, h_2^{(g)}$, and $h_4^{(g)}$. The meaning that a sync channel symbol includes a sync channel code sequence is that sync channel chips forming the sync channel code sequence are carried on subcarriers of the sync channel symbol.

An arbitrary hopping pattern used in the OFDM cellular system according to the current embodiment may differ from a cyclically shifted result of the hopping pattern, other hopping patterns, and cyclically shifted results of the other hopping patterns. A set of hopping patterns having this characteristic can be represented as "hopping pattern set unique to a cyclic shift operation". The cyclic shift will be described later in detail with reference to FIGS. 4 and 5.

Since each hopping pattern used in the embodiment A respectively corresponds to each code group and each hopping pattern used in the embodiment B respectively corresponds to each scrambling code, according to the embodiment A, a hopping pattern of each cell specifies a frame boundary and a code group of the cell, and according to the embodiment B, a hopping pattern of each cell specifies a frame boundary and a scrambling code of the cell. A mobile station can perform the cell search process using a forward link frame containing sync channel symbols, which are generated by performing the above-described process, and common pilot channel symbols.

Figure 3:
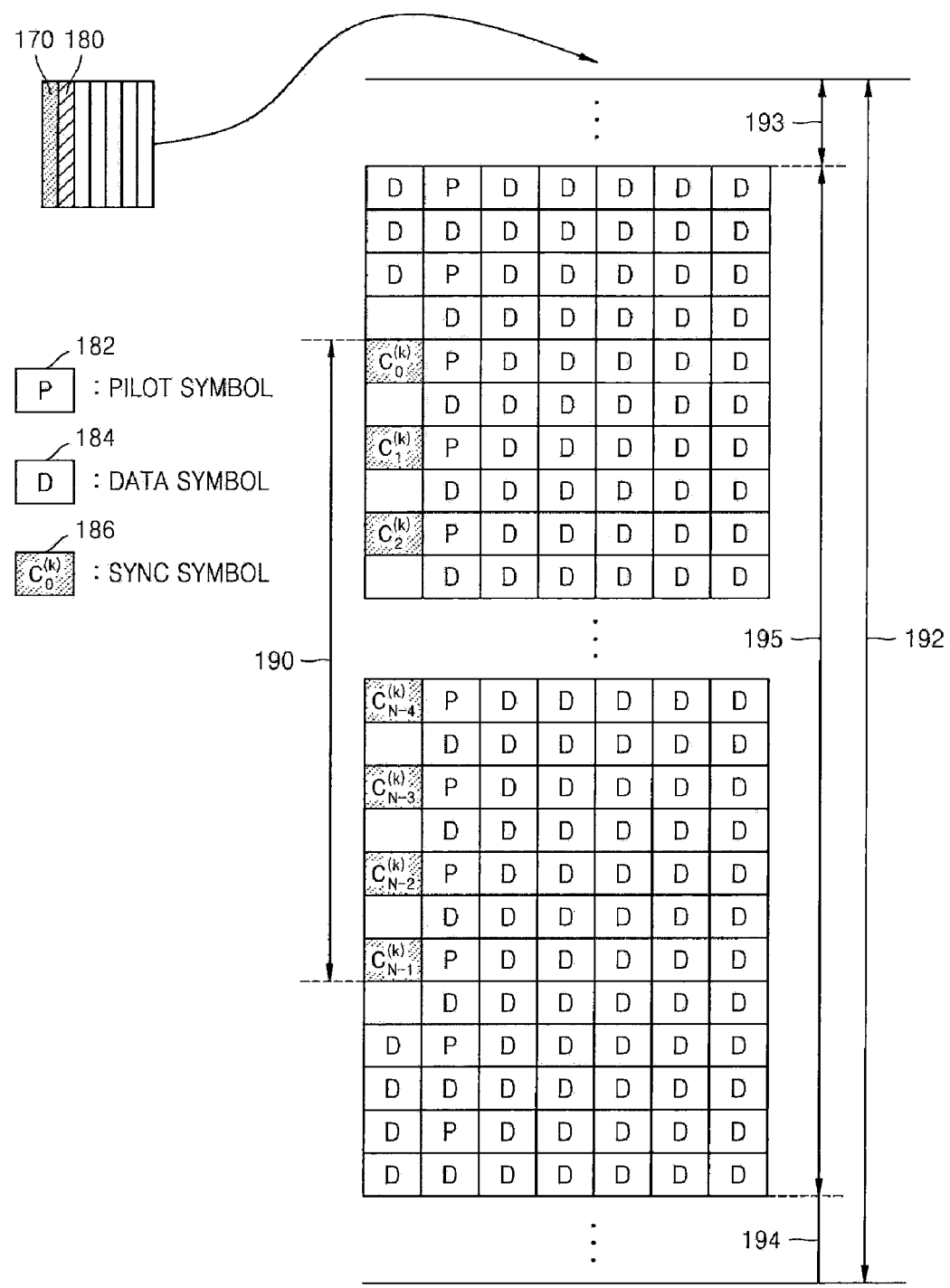
FIG. 3 illustrates a sub-frame containing a sync channel symbol according to an embodiment of the present invention.

FIG. 3 illustrates a sub-frame containing a sync channel symbol according to an embodiment of the present invention, e.g., a first sub-frame 110 of a first sync slot as illustrated in FIG. 2.

In the sub-frame illustrated in FIG. 3, a first OFDM symbol 170 includes data symbols 184 and sync channel chips, i.e., sync symbols 186. A second OFDM symbol 180 is a common pilot channel symbol and includes pilot symbols 182 and data symbols 184 in an FDM format. The common pilot channel symbol 180 or the pilot symbol 182 is used to estimate a channel for coherent demodulating of a data channel of a forward link and also used for the third detection step according to an embodiment of the present invention.

A sync channel can occupy all of a band 195, which remains, by excluding guard bands 193 and 194 or occupy a portion of the remaining band 195 as illustrated in FIG. 3. According to the current embodiment, a bandwidth indicated by reference numeral 190 is a sync channel occupied bandwidth, and a portion of the remaining band 195 is occupied by data symbols 184 or used as a guard band.

The method in which only a portion of the remaining band 195 is occupied by a sync channel may be applied to a system which must support a scalable bandwidth, such as a 3G-LTE system. That is, as illustrated in FIG. 3, by allowing the sync channel to occupy only a portion of a system bandwidth 192, mobile stations using a 1.25-MHz bandwidth, mobile stations using a 2.5-MHz bandwidth, and mobile stations using a 5-MHz bandwidth can acquire system timing of a target cell. For example, when the system bandwidth 192 is 20 MHz, only 1.25 MHz in the center, which remains due to the exclusion of a DC subcarrier, is used.

A cell search unit of a mobile station, which will be described later, can increase cell search performance by performing filtering so as to pass only a sync channel occupied band 190 illustrated in FIG. 3.

Methods in which a sync channel uses subcarriers include a method of mapping sync channel chips to all subcarriers in the sync channel occupied band 190 and a method of mapping sync channel chips to subcarriers periodically positioning in the frequency domain in the sync channel occupied band 190 and mapping predetermined symbols to the remaining subcarriers. In particular, the embodiment illustrated in FIG. 3 corresponds to the latter method, in which a sync channel chip is mapped to one of two adjacent subcarriers and a predetermined symbol is mapped to the other one. The predetermined symbol may be a null symbol. In particular, if the latter method is used, a time domain signal of a sync channel symbol excluding a cyclic prefix has a pattern repeated in a time domain, which will be described later with reference to FIG. 4. In FIG. 3, $C^{(k)}=[c_0^{(k)},c_1^{(k)},c_2^{(k)},\ldots,c_{N-1}^{(k)}]$ indicates a sync channel sequence used for code hopping of a sync channel symbol denoted by reference numeral 170 in the forward link frame described above. That is, $C^{(k)}=[c_0^{(k)},c_1^{(k)},c_2^{(k)},\ldots,c_{N-1}^{(k)}]$ indicates a sync channel code sequence in which a sync channel code index is k, and N denotes the length of the sync channel code sequence. In addition, $c_n^{(k)}$ is an n-th element of the sync channel code sequence in which a sync channel code index is k and corresponds to a sync channel chip having a value of a complex number. That is $c_n^{(k)}$ is transmitted by being mapped to a subcarrier belonging to the sync channel occupied band 190 illustrated in FIG. 3.

An arbitrary sequence can be used as the sync channel code sequence. However, according to an embodiment of the present invention, a Generalized Chirp Like (GCL) sequence defined using Equation 1 is used as the sync channel code sequence.

$$c_n^{(k)} = \exp\left\{-j2\pi k \frac{n(n+1)}{2N}\right\}, \quad (1)$$
$$n = 0, 1, \ldots, N-1, \quad k = 1, 2, \ldots, N-1$$

In Equation 1, k, $c_n^{(k)}$ and, N are the same as described above. In particular, in the GCL sequence, N is a prime number, and a total of N−1 GCL sequences exist.

FIG. 4 illustrates a hopping code according to an embodiment of the present invention. In detail, FIG. 4 illustrates a table showing hopping patterns respectively corresponding to code groups in the case where the number of code groups is 64 as illustrated in FIG. 1 and the number M of sync channel symbols in a frame is 5 as illustrated in FIG. 2. The current embodiment shows 64 hopping patterns (i.e., hopping codewords) of which a codeword length is 5 and a code alphabet size is 40. Each of the 64 hopping patterns is made up of a first sync channel code sequence index, a second sync channel code sequence index, a third sync channel code sequence index, a fourth sync channel code sequence index, and a fifth sync channel code sequence index. Referring to FIG. 4, a second sync channel code sequence index of a hopping pattern corresponding to a code group ID of 3 is 21.

A hopping pattern is assigned to each cell, and hopping pattern assigning methods include the embodiment A in which each hopping pattern respectively corresponding to each code group to which a scrambling code belongs is assigned and the embodiment B in which each hopping pattern respectively corresponding to each scrambling code is assigned. According to the embodiment A, different hopping patterns are assigned to cells having different code groups. For example, referring to FIGS. 1 and 4, a hopping pattern (5, 6, 7, 8, 9) corresponding to a code group ID of 0 is assigned to a cell having a scrambling code of which a scrambling code ID is 256, and a hopping pattern (10, 11, 12, 13, 14) corresponding to a code group ID of 1 is assigned to a cell having a scrambling code of which a scrambling code ID is 193.

A case where a base station of a cell having a scrambling code ID of 192 generates a forward link frame with reference to FIGS. 1, 2, and 4 will now be described in order to describe a hopping pattern. A scrambling code having the scrambling code ID of 192 belongs to a code group having a code group ID of 0. A hopping pattern uniquely corresponding to the code group ID of 0 is $h^{(g)}=(h_0^{(g)}=5, h_1^{(g)}=6, h_2^{(g)}=7, h_3^{(g)}=8, h_4^{(g)}=9)$ with reference to FIG. 4. That is, the code group ID of 0 uniquely corresponds to the hopping pattern ID of g. Thus, the base station of the cell inserts a GCL sequence obtained by substituting k=5 into Equation 1 into the sync channel symbol at the position of reference numeral 160 illustrated in FIG. 2, inserts a GCL sequence obtained by substituting k=6 in Equation 1 into the sync channel symbol at the position of reference numeral 162 illustrated in FIG. 2, and transmits the generated forward link frame to mobile stations. The sync channel symbols at the position of reference numerals 164, 166, and 168 illustrated in FIG. 2 can be described as well.

A base station belonging to each cell generates a forward link frame containing M sync channel symbols code-hopped according to an assigned hopping pattern and transmits the generated forward link frame to mobile stations. A mobile station detects a hopping pattern of a target base station from reception signals. The target base station is a base station corresponding to a cell for which the mobile station initially searches.

Figures 5, 6:
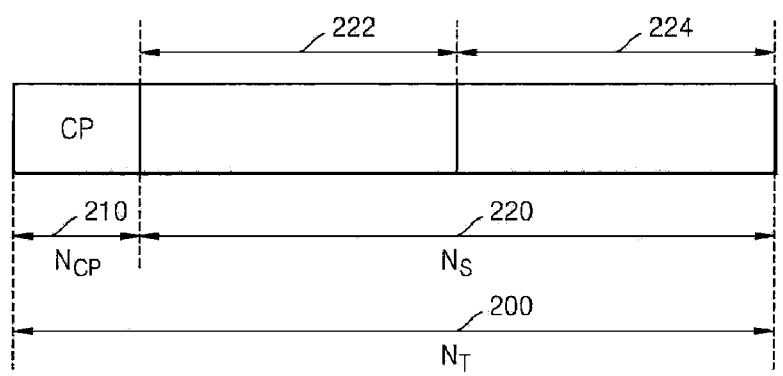
FIG. 5 is a table for describing the concept of cyclically shifted hopping sequences (hopping patterns)
FIG. 6 illustrates a structure of a sync channel symbol in the time domain according to an embodiment of the present invention.

FIG. 5 is a table for describing the concept of cyclically shifted hopping sequences (hopping patterns). In detail, FIG. 5 shows hopping patterns obtained by cyclically shifting the hopping pattern (5, 6, 7, 8, 9) corresponding to the code group ID of 0 illustrated in FIG. 4 using cyclic shift counts 0, 1, 2, 3, 4. Each cyclic shift index indicates a cyclically shifted count.

It can be known that the set of hopping patterns illustrated in FIG. 4 is a hopping pattern set unique to a cyclic shift operation. That is, the number of hopping patterns that can be obtained by cyclically shifting the 64 hopping patterns illustrated in FIG. 4 is 320 (=5×64), and the 320 hopping patterns are different from each other. This characteristic allows a mobile station to detect both a code group ID and a frame boundary in the second detection step according to the embodiment A and detect both a scrambling code ID and a frame boundary in the second detection step according to the embodiment B.

A set of hopping patterns according to an embodiment of the present invention requires only uniqueness to a cyclic shift operation, and in the principle, the number of hits between any two of hopping patterns is not limited. The number of hits indicates the number of cases where the same sync channel code sequence index exists in the same position of two arbitrary hopping patterns, and is related to a Hamming distance. If the number of hits between two arbitrary hopping patterns is 0, a Hamming distance between the two arbitrary hopping patterns is equal to the hopping codeword length M. Thus, the number of hits between two arbitrary hopping patterns is equal to a value obtained by subtracting a Hamming distance from a hopping codeword length. For example, the number of hits between the hopping pattern (5, 6, 7, 8, 9) and a hopping pattern (9, 11, 13, 15, 17) is 0, and the number of hits between the hopping pattern (5, 6, 7, 8, 9) and a hopping pattern (11, 13, 15, 17, 9) cyclically shifted from the hopping pattern (9, 11, 13, 15, 17) by an amount of 4 is 1 (i.e., the fifth sync channel code sequence index 9 is hit). The minimum Hamming distance between any two of the 320 hopping patterns that can be obtained considering a cyclic shift operation from the hopping code illustrated in FIG. 4 is 4. In other words, the maximum number of hits between any two of the 320 hopping patterns that can be obtained considering a cyclic shift operation from the hopping code illustrated in FIG. 4 is equal to or less than 1.

However, another embodiment of the present invention uses a set of hopping patterns, i.e., a hopping code, which has uniqueness to a cyclic shift operation and has a limited number of hits. This embodiment can have an advantage in a situation where a dual mode mobile station for simultaneously supporting a Global System for Mobile Communication (GSM) system and a 3G-LTE OFDM system should perform handover from the GSM system to the 3G-LTE OFDM system. That is, a time allowed for the dual mode mobile station, which is demodulating a GSM forward link signal, to end reception of the GSM forward link signal for a while and receive and search a 3G-LTE OFDM forward link signal having a different frequency is around 4.6 msec. The minimum number of receivable sync channel symbols of the 3G-LTE OFDM forward link signal during 4.6 msec is 2 in the frame structure illustrated in FIG. 2. That is, the dual mode mobile station should perform the second detection step only with two sync channel symbols. If the number of hits between any two of the 320 hopping patterns that can be obtained considering the cyclic shift operation is equal to or greater than 2, the dual mode mobile station may not perform the second detection step. Thus, in this system, the number of hits between any two of the 320 hopping patterns is preferably equal to or less than 1. That is, only if the minimum Hamming distance between any two of the 320 hopping patterns that can be obtained considering the cyclic shift operation is 4, the dual mode mobile station can perform a cell search according to the 3G-LTE OFDM system while the dual mode mobile station is communicating in the GSM system, and perform hard handover.

Likewise, if the number of hits between any two of the 320 hopping patterns that can be obtained considering the cyclic shift operation is 0, the second detection step may be performed with only a single sync channel symbol. That is, in this case, any two of the 64 hopping patterns must not include any common sync channel code sequence index regardless of positions, and to do this, minimum 320 (64×5) sync channel code sequences must exist in an OFDM cellular system according to an embodiment of the present invention. For example, a hopping code of which the number of hits is 0 can be applied to a case where the number of sync channel symbols per frame is 4. That is, unlike the embodiment illustrated in FIG. 2 in which the number of sync channel symbols per frame is 5, in the case where the number of sync channel symbols per frame is 4, the hopping code of which the number of hits is 0 can have an advantage when the number of sync channel symbols acquired by a mobile station during 4.6 msec is 1 under the worst condition. In this case, the mobile station can perform the second detection step including a process of detecting a hopping pattern of a target cell and a process of detecting a frame boundary only with a single sync channel symbol.

Thus, if it is assumed that the minimum number of sync channel symbols of a 3G-LTE OFDM system, which can be received during a 4.6-msec transmission gap duration of a GSM system, is Q, the maximum number of hits between any two of hoping codewords that can be obtained considering the cyclic shift operation must be equal to or less than Q−1. In other words, if it is assumed that a hoping codeword length is L, the minimum Hamming distance of a hopping code considering the cyclic shift operation must be equal to or greater than L−Q+1.

As described above, both the embodiment using a set of hopping patterns having uniqueness to a cyclic shift operation and the embodiment using a set of hopping patterns having uniqueness to a cyclic shift operation and a limited number of hits are within the scope and spirit of the present invention.

FIG. 6 illustrates a structure of a sync channel symbol in the time domain according to an embodiment of the present invention.

Referring to FIG. 6, $N_T$ denotes the number of samples of the entire sync channel symbol duration 200, $N_{CP}$ denotes the number of samples of a cyclic prefix (CP) duration 210, and $N_S$ denotes the number of samples of a symbol duration 220 excluding the CP duration 210.

In particular, as illustrated in FIG. 3, if sync channel chips are mapped to only odd-th or even-th subcarriers in a sync channel occupied band and null symbols are mapped to the remaining subcarriers, a first duration 222 and a second duration 224 forming the duration denoted by reference numeral 220 have a specific pattern. If the sync channel symbol uses DC component subcarriers, the first duration 222 and the second duration 224 have the same waveform in a time domain signal of a transmitter end, and if the sync channel symbol does not use the DC component subcarriers, the second duration 224 has a waveform 180° phase reversed from a waveform of the first duration 222. If a mobile station uses this time domain repetition pattern of the sync channel symbol, the mobile station can perform the first detection step with a simple structure using a differential correlation operation, which will be described later in detail. The first duration 222 and the second duration 224 may also be symmetrical to each other. In this case, reverse differential correlation can be used. The differential correlation and the reverse differential correlation used in the first detection step, i.e., a symbol sync acquisition process, are within the spirit and scope of the present invention.

Figure 7:
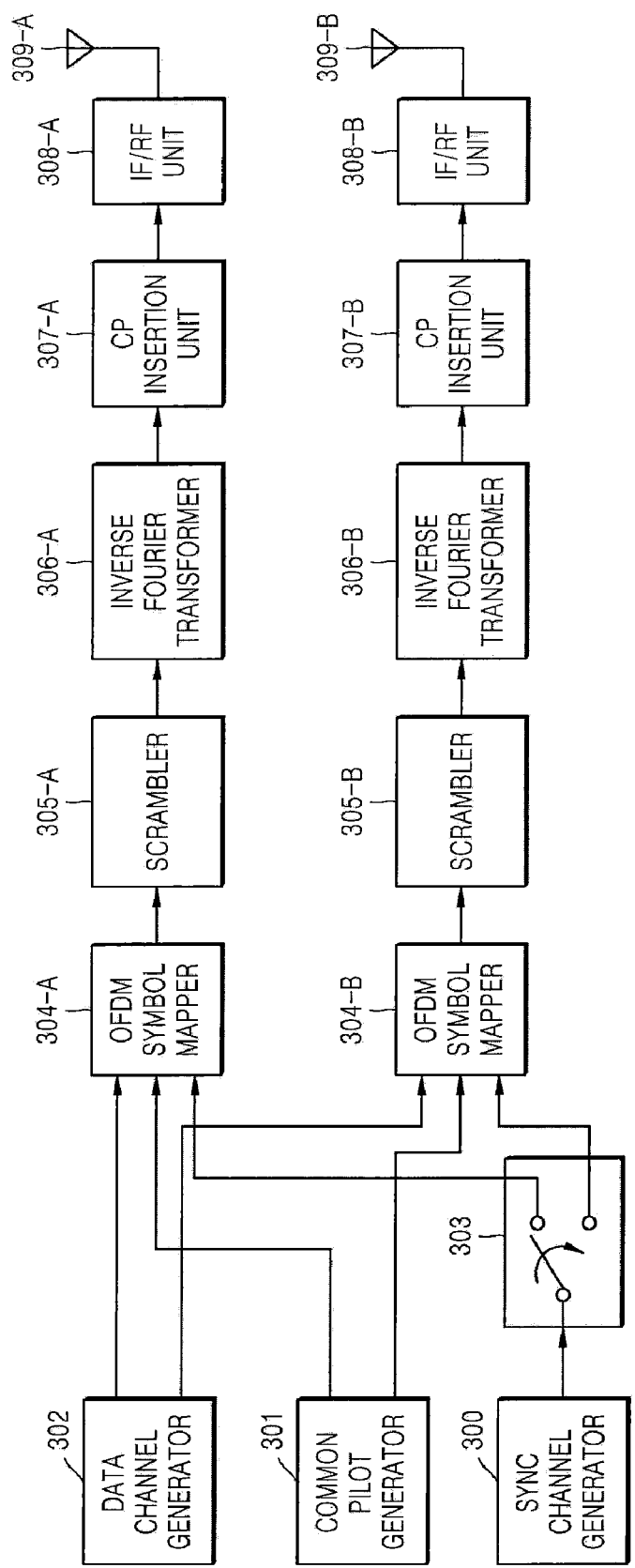
FIG. 7 is a block diagram of a frame transmission apparatus according to an embodiment of the present invention.

FIG. 7 is a block diagram of a frame transmission apparatus according to an embodiment of the present invention. Referring to FIG. 7, the frame transmission apparatus includes a sync channel generator 300, a common pilot channel generator 301, a data channel generator 302, a diversity controller 303, OFDM symbol mappers 304-A and 304-B, scramblers 305-A and 305-B, inverse Fourier transformers 306-A and 306-B, CP insertion units 307-A and 307-B, intermediate frequency/radio frequency (IF/RF) units 308-A and 308-B, and transmission antennas 309-A and 309-B. In general, the frame transmission apparatus is included in a base station.

The data channel generator 302 generates data symbols such as reference numeral 184 of FIG. 3, and the common pilot channel generator 301 generates pilot symbols such as reference numeral 182 of FIG. 3. The sync channel generator 300 generates sync channel chips, i.e., sync symbols, such as reference numeral 186 of FIG. 3, corresponding to a hopping pattern assigned to a cell to which the frame transmission apparatus belongs. That is, if the hopping pattern assigned to the cell is (5, 6, 7, 8, 9), the sync channel generator 300 generates N sync channel chips obtained by substituting k=5 into Equation 1 for a sync channel symbol included in a first sync slot. If the number of subcarriers which can be used for mapping of a sync channel symbol is less than N, e.g., if N=41 and the number of subcarriers which can be used for mapping of the sync channel symbol is 38, the last 3 elements $c_{N-3}^{(k)}$, $c_{N-2}^{(k)}$, and $c_{N-1}^{(k)}$, of the sync channel sequence defined using Equation 1 are not used.

Each of the OFDM symbol mappers 304-A and 304-B maps symbols of the data channel, the pilot channel, and the sync channel to positions in the frequency domain as illustrated in FIG. 3. Each of the scramblers 305-A and 305-B multiplies an output of each of the OFDM symbol mappers 304-A and 304-B, i.e., a mapping result corresponding to OFDM symbols excluding a sync channel symbol from the mapping result, by a unique scrambling code of the cell in the frequency domain.

Each of the inverse Fourier transformers 306-A and 306-B performs an inverse Fourier transform on the output of each of the scramblers 305-A and 305-B, and Each of the CP insertion units 307-A and 307-B inserts a CP into the output of each of the inverse Fourier transformers 306-A and 306-B.

Each of the IF/RF units 308-A and 308-B up-converts an output signal of each of the CP insertion units 307-A and 307-B, which is a baseband signal, to a band pass signal and amplifies the up-converted signal. Each of the transmission antennas 309-A and 309-B transmits the amplified signal.

The frame transmission apparatus illustrated in FIG. 7 transmits sync channel symbols while achieving transmission diversity using the 2 transmission antennas 309-A and 309-B. The transmission diversity using the diversity controller 303 illustrated in FIG. 7 will now be described. Sync channel symbols belonging to adjacent sync slots are transmitted through different transmission antennas in order to achieve spatial diversity. For example, a sync channel symbol belonging to a first sync slot is transmitted through the first transmission antenna 309-A, a sync channel symbol belonging to a second sync slot is transmitted through the second transmission antenna 309-B, and a sync channel symbol belonging to a third sync slot is transmitted through the first transmission antenna 309-A. This switching so as to achieve the spatial diversity is performed by the diversity controller 303. That is, the transmission diversity scheme according to the current embodiment is a method of applying Time Switching Transmit Diversity (TSTD) to the sync channel, and the diversity controller 303 provides an output of the sync channel generator 300 to the OFDM symbol mapper 304-A or 304-B by switching the output of the sync channel generator 300.

Besides the TSTD diversity, delay diversity can be used as the transmission diversity.

Figure 8:
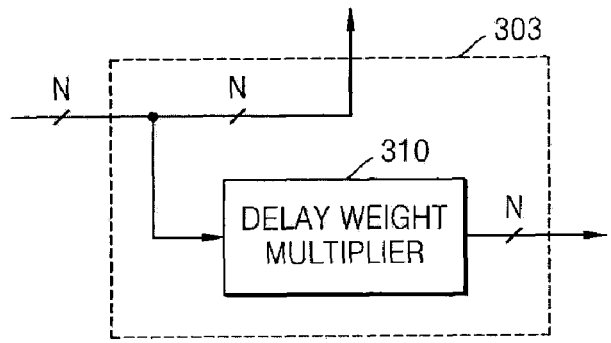
FIGS. 8 and 9 are a block diagram and a conceptual diagram, respectively, of a diversity controller in a case where delay diversity is applied to the frame transmission apparatus illustrated in FIG. 7, according to an embodiment of the present invention.
Figure 9:
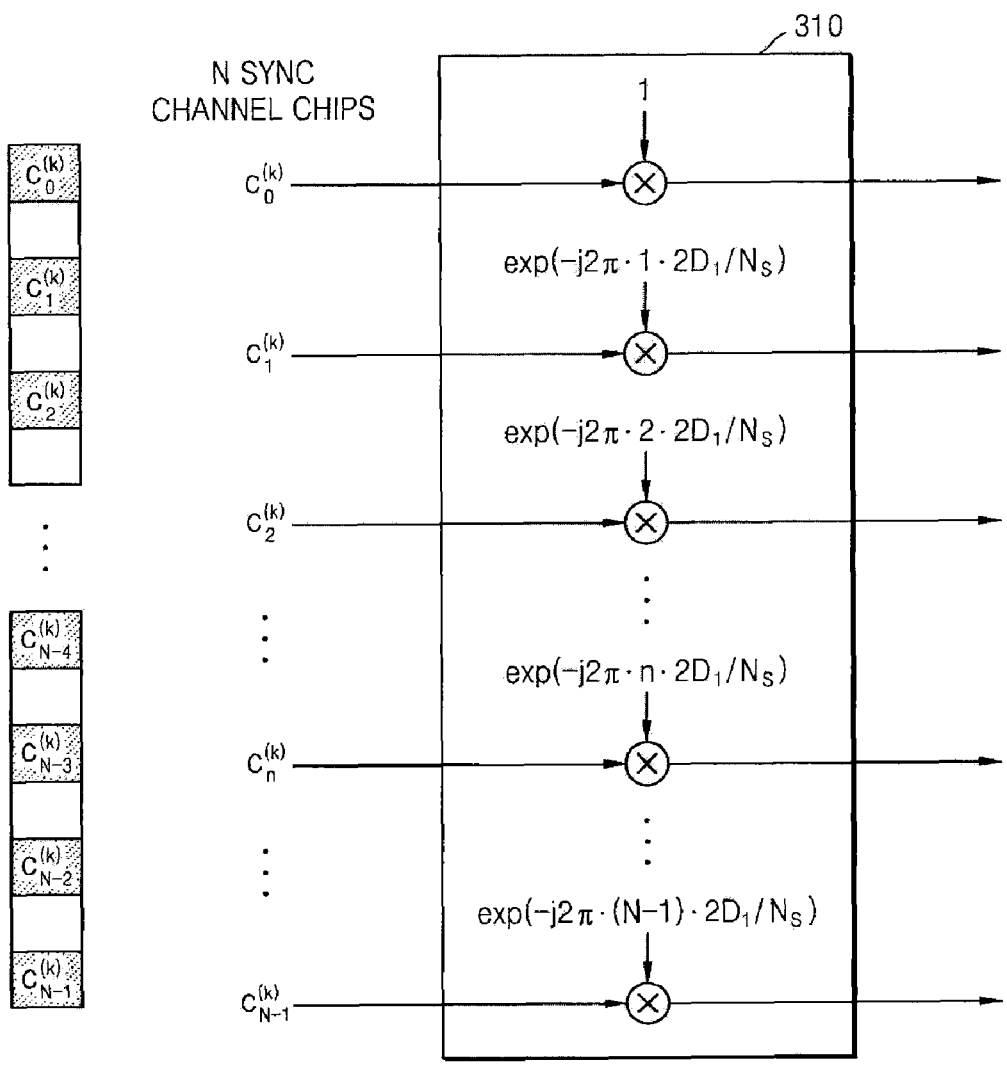

FIGS. 8 and 9 are a block diagram and a conceptual diagram, respectively, of the diversity controller 303 in a case where the delay diversity is applied to the frame transmission apparatus illustrated in FIG. 7, according to an embodiment of the present invention.

Referring to FIG. 8, the diversity controller 303 includes a delay weight multiplier 310. N sync channel chips forming a single sync channel code sequence are separated into two data paths. According to the upper data path, the sync channel chips are directly provided to the OFDM symbol mapper 304-A. According to the lower data path, the sync channel chips are input to the delay weight multiplier 310, and the output of the delay weight multiplier 310 is input to the OFDM symbol mapper 304-B.

FIG. 9 is a conceptual diagram for explaining an operation of the delay weight multiplier 310.

Referring to FIG. 9, the delay weight multiplier 310 delays the N generated sync channel chips and includes N multipliers.

Each of the N multipliers multiplies each of the N generated sync channel chips by a weight. A weight w(n) multiplied by a sync channel chip assigned to an $n^{th}$ subcarrier used by the sync channel symbol, i.e., an $n^{th}$ sync channel chip, is calculated using Equation 2.

$$w(n)=\exp(-j2\pi n \cdot 2D_m/N_s), n=0,1,2,\ldots,N-1 \quad (2)$$

In Equation 2, $D_m$ denotes a delay of an FFT sample unit in the time domain for an $m^{th}$ transmission antenna, and $N_s$ denotes the number of FFT samples. Since it is assumed, as illustrated in FIG. 3, that sync symbols are carried on every other subcarrier, $2D_m$ is used instead of $D_m$. If the number of transmission antennas 309-A and 309-B is 2 as illustrated in FIG. 7, a delay to the first transmission antenna 309-A is $D_0=0$, and a delay to the second transmission antenna 309-B is $D_1$.

Though the frame transmission apparatus having the two transmission antennas 309-A and 309-B has been described with reference to FIGS. 7, 8, and 9, it will be understood by those of ordinary skill in the art that the transmission diversity scheme can be applied to a frame transmission apparatus having three or more transmission antennas using the same principle, and if a frame transmission apparatus has only one transmission antenna 309-A, the transmission antenna 309-B, the OFDM symbol mapper 304-B, the scrambler 305-B, the inverse Fourier transformer 306-B, the CP insertion unit 307-B, the IF/RF unit 308-B, and the diversity controller 303 can be omitted.

Figure 10:
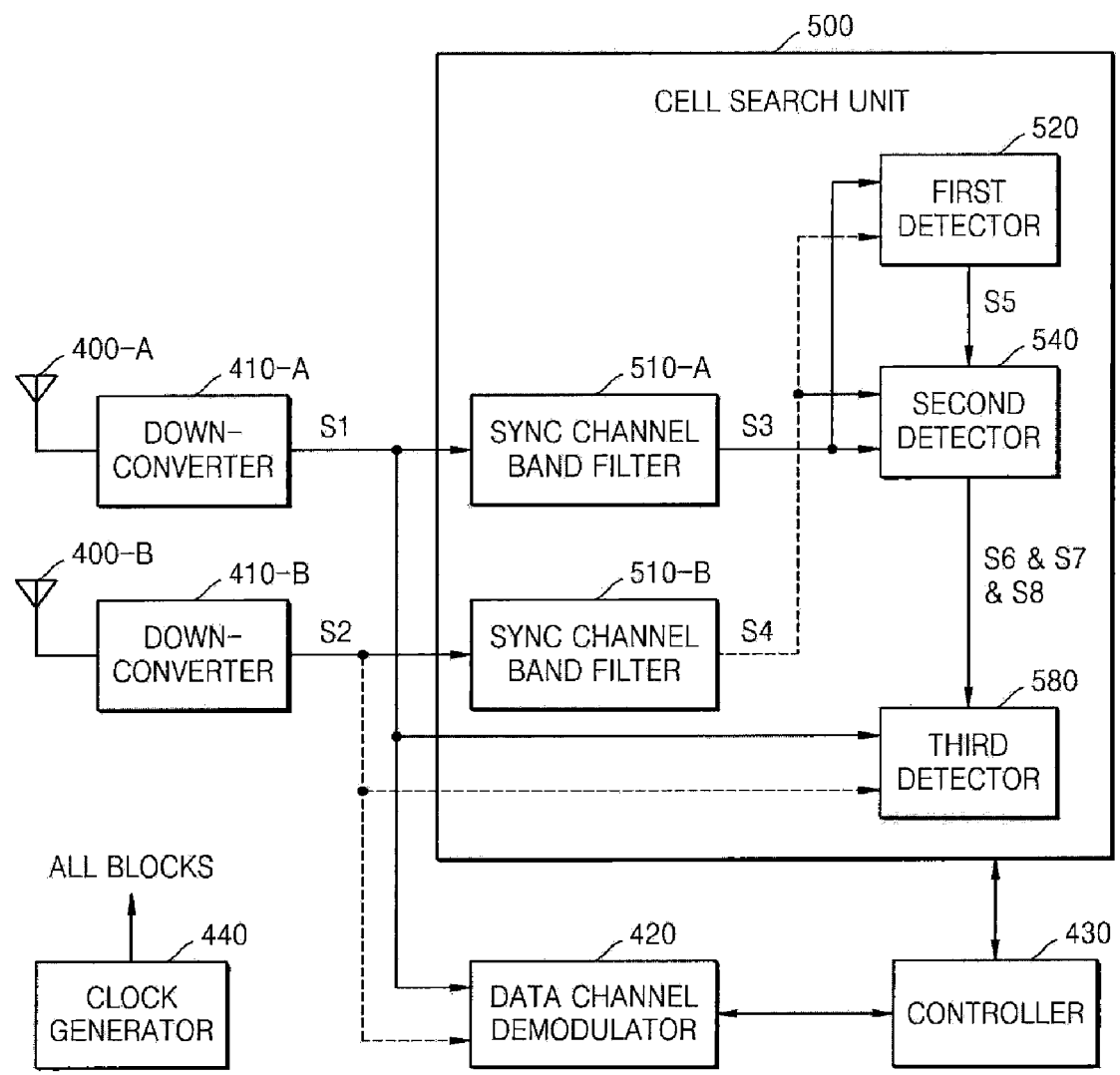
FIG. 10 is a block diagram of a receiver of a mobile station according to an embodiment of the present invention.

FIG. 10 is a block diagram of a receiver of a mobile station according to an embodiment of the present invention. The mobile station has at least one reception antenna, and the mobile station according to the current embodiment has 2 reception antennas. Referring to FIG. 10, the receiver of the mobile station includes reception antennas 400-A and 400-B, down-converters 410-A and 410-B, a cell search unit 500, a data channel demodulator 420, a controller 430, and a clock generator 440.

RF signal type frames transmitted from base stations are received through the reception antennas 400-A and 400-B and converted to baseband signals S1 and S2 by the down-converters 410-A and 410-B.

The cell search unit 500 searches for a target cell using a sync channel symbol and a common pilot channel symbol included in the down-converted signals S1 and S2. As a result of the cell search, symbol synchronization information, frame boundary information, code group information, and scrambling code information can be detected as described above.

The controller 430 controls the cell search unit 500 and the data channel demodulator 420. That is, the controller 430 controls timing and descrambling of the data channel demodulator 420 based on a cell search result acquired by controlling the cell search unit 500. The data channel demodulator 420 demodulates a reception data channel symbol included in the down-converted signals S1 and S2 under control of the controller 430. All the hardware in the mobile station operates by being synchronized with a clock generated by the clock generator 440.

The cell search unit 500 includes sync channel band filters 510-A and 510-B, a first detector 520, a second detector 540, and a third detector 580.

The sync channel band filters 510-A and 510-B perform band pass filtering for passing only the sync channel occupied band 190 from among the entire system bandwidth 192 illustrated in FIG. 3 with respect to the down-converted signals S1 and S2.

The first detector 520 acquires symbol sync information S5 using a sync channel symbol included in the filtered signals S3 and S4. The second detector 540 acquires code group information S7 and frame boundary information S6 using the acquired symbol sync information S5 and the 64 hopping patterns illustrated in FIG. 4 pre-stored in a memory (not shown) of the mobile station according to the embodiment A. The second detector 540 acquires scrambling code information S7 and frame boundary information S6 using the acquired symbol sync information S5 and the 64 hopping patterns illustrated in FIG. 4 pre-stored in the memory of the mobile station according to the embodiment B.

The second detector 540 can increase detection performance by performing frequency offset estimation and compensation before detecting the code group information or scrambling code information S7 and the frame boundary information S6. In this case, estimated frequency offset information S8 can be provided to the third detector 580 to perform the third detection step.

The third detector 580 detects a scrambling code of the target cell by means of a pilot correlation of the down-converted signals S1 and S2 based on the detected code group information S7 and frame boundary information S6 according to the embodiment A. In detail, the third detector 580 extracts a signal corresponding to a position of the common pilot channel symbol from among the down-converted signals S1 and S2, i.e., the reception common pilot channel symbol, based on the detected frame boundary information S6, calculates correlation values between the reception common pilot channel symbol and scrambling codes belonging to a code group corresponding to the detected code group information S7, and detects the scrambling code of the target cell based on the calculated correlation values.

Since the second detector 540 has detected the scrambling code, the cell search unit 500 according to the embodiment B-1 does not include the third detector 580, considering calculation complexity and detection speed. However, the cell search unit 500 according to the embodiment B-2 includes the third detector 580 to perform verification of the detection result of the first detector 520 and the detection result of the second detector 540.

That is, the third detector 580 according to the embodiment B-2 performs the verification of the detection result of the first detector 520 and the detection result of the second detector 540 by means of a pilot correlation of the down-converted signals S1 and S2 based on the detected scrambling code information S7 and frame boundary information S6. The signal processing corresponding to the pilot correlation of the third detector 580 according to the embodiment B-2 is the same as the signal processing corresponding to the pilot correlation of the third detector 580 according to the embodiment A. However, a scrambling code used in the pilot correlation according to the embodiment B-2 can vary according to what verification algorithm is used. According to a verification algorithm according to an embodiment of the present invention, the third detector 580 according to the embodiment B-2 performs a pilot correlation using only a scrambling code corresponding to the detection result of the second detector 540, i.e., the scrambling code information S7, compares the calculated pilot correlation value to a predetermined threshold, and determines based on the comparison result whether the detection result of the first detector 520 and the detection result of the second detector 540 are reliable. However, it will be understood by those of ordinary skill in the art that besides the verification algorithm according to this embodiment, various verification algorithms can exist such as an algorithm of analyzing all pilot correlation values calculated using all scrambling codes for the pilot correlation and determining based on the analysis result whether the detection result of the first detector 520 and the detection result of the second detector 540 are reliable.

Though the third detector 580 uses the down-converted signals S1 and S2 in FIG. 10, if the reception common pilot channel symbol is not affected by the sync channel band filters 510-A and 510-B, the outputs S3 and S4 of the sync channel band filters 510-A and 510-B can be used for the pilot correlation instead of the down-converted signals S1 and S2.

Figure 11:
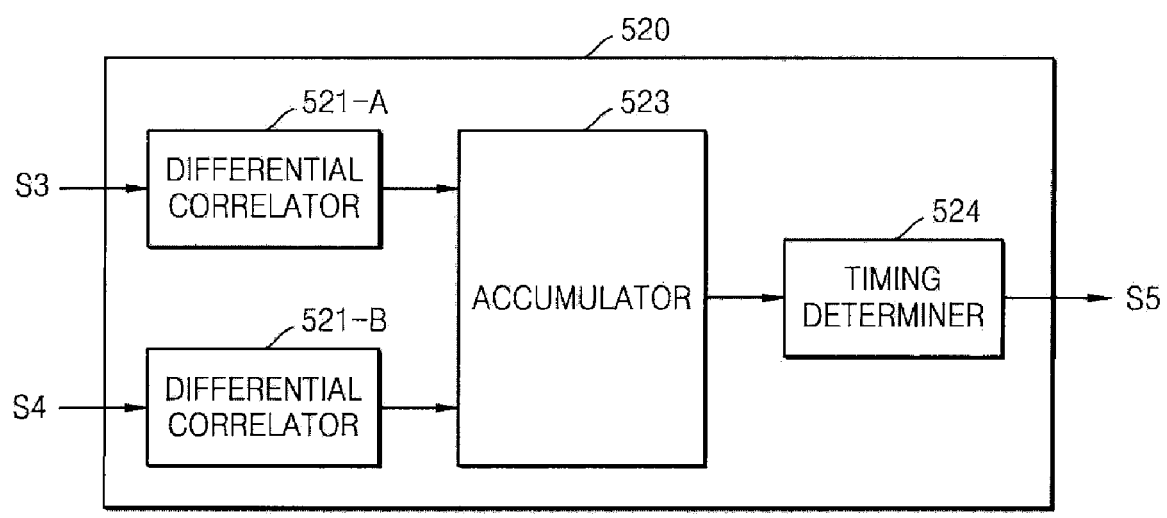
FIG. 11 is a block diagram of a first detector of the receiver illustrated in FIG. 10, according to an embodiment of the present invention.

FIG. 11 is a block diagram of the first detector 520 of the receiver illustrated in FIG. 10, according to an embodiment of the present invention. Referring to FIG. 11, the first detector 520 includes differential correlators 521-A and 521-B, an accumulator 523, and a timing determiner 524. In detail, the current embodiment is an embodiment for symbol sync acquisition in a case where a sync channel symbol (a PSC symbol in the hierarchical structure) has a time domain repetition pattern. However, it will be understood by those of ordinary skill in the art that besides the current embodiment, by using various other embodiments, such as a matching filter method based on a reference signal corresponding to the sync channel symbol (an OFDM symbol related to the PSC symbol in the hierarchical structure), the symbol sync acquisition can be performed even if the sync channel symbol (the OFDM symbol related to the PSC symbol in the hierarchical structure) does not have the time domain repetition pattern.

Each of the differential correlators 521-A and 521-B multiplies a sample value of each of the output signals S3 and S4 of the sync channel band filters 510-A and 510-B by a sample value received previously to the current sample value by a time corresponding to an $N_s/2$ sample using the time domain signal repetition characteristic of sync channel symbols illustrated in FIGS. 3 and 6 and accumulates the multiplication result. Here, $N_S$ is the same as described in FIG. 6, and $N_S/2$ corresponds to the number of samples of the first duration 222 or the second duration 224.

Equations 3 and 4 represent outputs of the differential correlators 521-A and 521-B at an arbitrary sample point n according to an embodiment of the present invention.

$$z_a(n) = \left| \sum_{i=0}^{N_{CP} + \frac{N_S}{2} - 1} r_a^*(n+i) r_a\left(n+i+\frac{N_S}{2}\right) \right|^2 \quad (3)$$

$$z_a(n) = \left| \sum_{i=0}^{N_{CP} + \frac{N_S}{2} - 1} r_a^*(n+i) r_a\left(n+i+\frac{N_S}{2}\right) \right| \quad (4)$$

In Equations 3 and 4, ( )* denotes a complex conjugate value, a denotes a reception antenna index having 0 or 1, $r_0()$ corresponds to reference character S3, and $r_1()$ corresponds to reference character S4.

A square of an absolute value and the absolute value are obtained in Equations 3 and 4 in order to maintain performance of the first detector 520 regardless of an initial frequency offset. Unlike Equation 3 or 4, if the absolute value is not obtained, the symbol sync acquisition performance may be decreased in a state where the initial frequency offset is large.

It can be known with reference to FIGS. 2 and 6 that the number of samples corresponding to a sync slot length is $4 \times 7 \times N_T$, and a single sync channel symbol is included in continuous $4 \times 7 \times N_T$ samples starting from an arbitrary sample position. Thus, each of the differential correlators 521-A and 521-B calculates a differential correlation value of each of the continuous $4 \times 7 \times N_T$ samples starting from an arbitrary sample position and provides the calculated differential correlation values to the timing determiner 524, and the timing determiner 524 determines a position of a sample, which corresponds to the maximum differential correlation value among the $4 \times 7 \times N_T$ differential correlation values, as sync channel symbol timing. However, the first detector 520 illustrated in FIG. 11 may include the accumulator 523 in order to increase symbol sync acquisition performance.

The accumulator 523 combines the outputs of the differential correlators 521-A and 521-B, which correspond to the same sample position, calculates combining values at $4 \times 7 \times N_T$ sample positions, and accumulates each combining value for samples separated by every sync slot length from each sample position. That is, an output γ(n) of the accumulator 523 can be represented by Equation 5.

$$\gamma(n) = \sum_{b=0}^{b=B-1} z(n+bL) \quad (5)$$

Here, z(n) denotes the combining result corresponding to a sample index position n, and if a simple summing method as the combining method is used, $z(n) = z_0(n) + z_1(n)$. L denotes the number of samples corresponding to a sync slot (e.g. $4 \times 7 \times N_T$ with reference to FIGS. 2 and 6). B denotes the number of accumulations. If the first detector 520 includes the accumulator 523, the timing determiner 524 determines a position of a sample corresponding to the maximum value from among γ(0), γ(1), . . . , γ($4 \times 7 \times N_T-1$) stored in the accumulator 523 as sync channel symbol timing and outputs the symbol sync information S5, which is information on the sync channel symbol timing, to the second detector 540. That is, $N_T$ symbols starting from the sample position corresponding to the maximum value are samples of a reception sync channel symbol.

Figure 12:
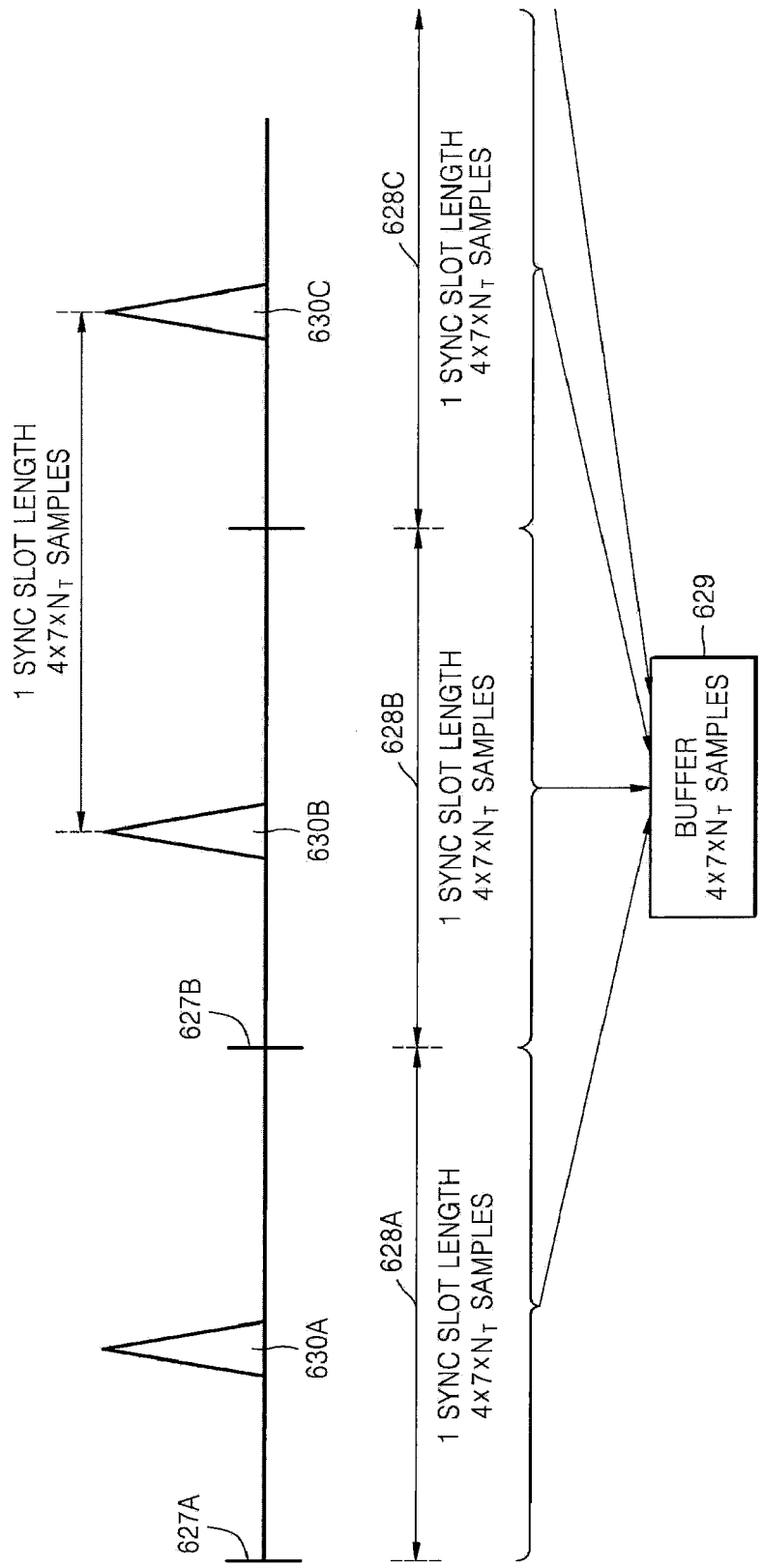
FIG. 12 is a graph illustrating differential correlation values calculated by a differential correlator illustrated in FIG. 11, according to an embodiment of the present invention.

FIG. 12 is a graph illustrating differential correlation values calculated by the differential correlator 521-A or 521-B illustrated in FIG. 11, according to an embodiment of the present invention. For convenience of description, it is assumed that the differential correlation values are obtained in an ideal channel environment in which fading or noise does not exist in a forward link channel.

In FIG. 12, the horizontal axis represents time or a sample position index, and the vertical axis represents a differential correlation value. Reference numeral 627 denotes a position of a first sample for which the differential correlator 521-A or 521-B performs the differential correlation. The differential correlator 521-A or 521-B calculates a differential correlation value of each of L samples 628A starting from the first sample position 627A and provides the calculated L differential correlation values to the accumulator 523. Thereafter, the differential correlator 521-A or 521-B calculates a differential correlation value of each of L samples 628B starting from a position 627B of a sample next to a sample for which the differential correlator 521-A or 521-B performed the last differential correlation and provides the calculated L differential correlation values to the accumulator 523. The differential correlator 521-A or 521-B repeats this process B times. L denotes the number of samples per sync slot, and reference numeral 629 corresponds to the accumulator 523. Among all the differential correlation values corresponding to the positions of the continuous L samples, sample positions 630A, 630B, and 630C at which a peak occurs exist as illustrated in FIG. 12.

Figure 13:
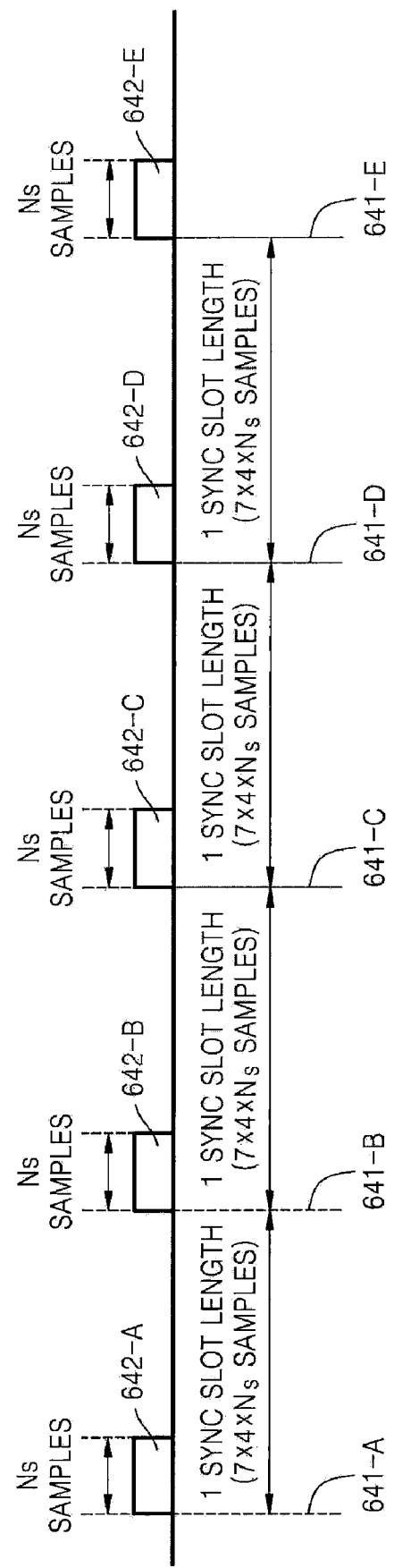
FIG. 13 is a diagram for describing a signal used in a second detector of the receiver illustrated in FIG. 10, according to an embodiment of the present invention.

FIG. 13 is a diagram for describing a signal used in the second detector 540 of the receiver illustrated in FIG. 10, according to an embodiment of the present invention.

Reference numerals 641-A, 641-B, 641-C, 641-D, and 641-E denote sync channel symbol timings, and in particular, the first sync channel symbol timing 641-A is called initial reference timing in the present specification. These sync channel symbol timings are detected by the first detector 520 as described above, and information on the sync channel symbol timings is provided to the second detector 540. According to the forward link frame illustrated in FIG. 2, one of reference numerals 641-A, 641-B, 641-C, 641-D, and 641-E is a frame boundary.

In FIG. 13, reference numerals 642-A, 642-B, 642-C, 642-D, and 642-E correspond to samples of a reception sync channel symbol used in the second detector 540, and it can be known with reference to FIGS. 6, 10, and 13 that the signal is obtained by removing $N_{CP}$ samples of each CP from the signal S3 or S4. The CP can be removed based on the initial reference timing 641-A, and regardless of whether this CP removing process is performed by the first detector 520, the second detector 540, or another component (not shown), the CP removing process is within the scope and spirit of the present invention.

The second detector 540 detects a hopping pattern of a target cell using the samples 642-A, 642-B, 642-C, 642-D, and 642-E from which CPs are removed. That is, the second detector 540 uses $N_S$ sample values in every sync slot.

Figure 14:
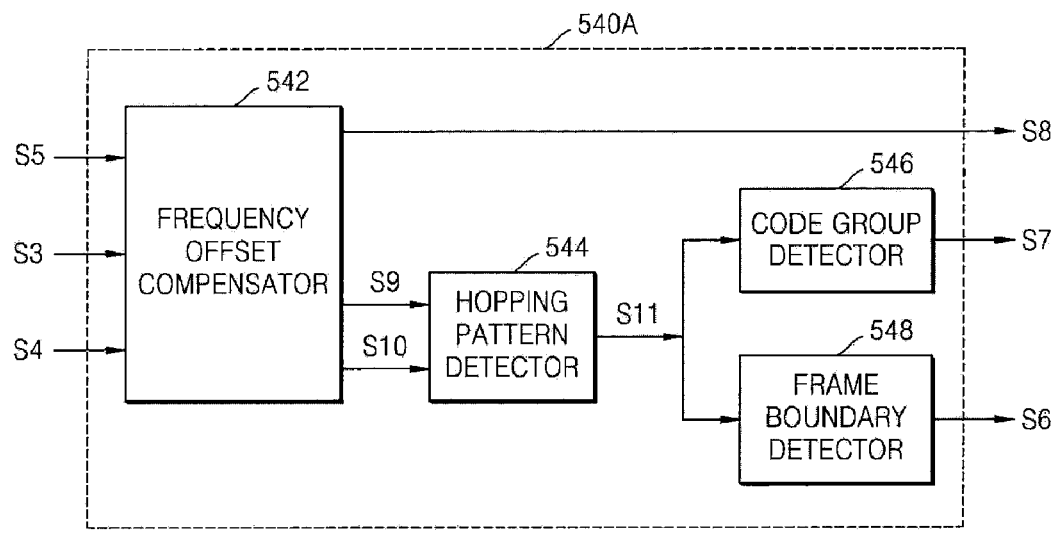
FIGS. 14 and 15 are block diagrams of the second detector of the receiver illustrated in FIG. 10, according to an embodiment of the present invention.
Figure 15:
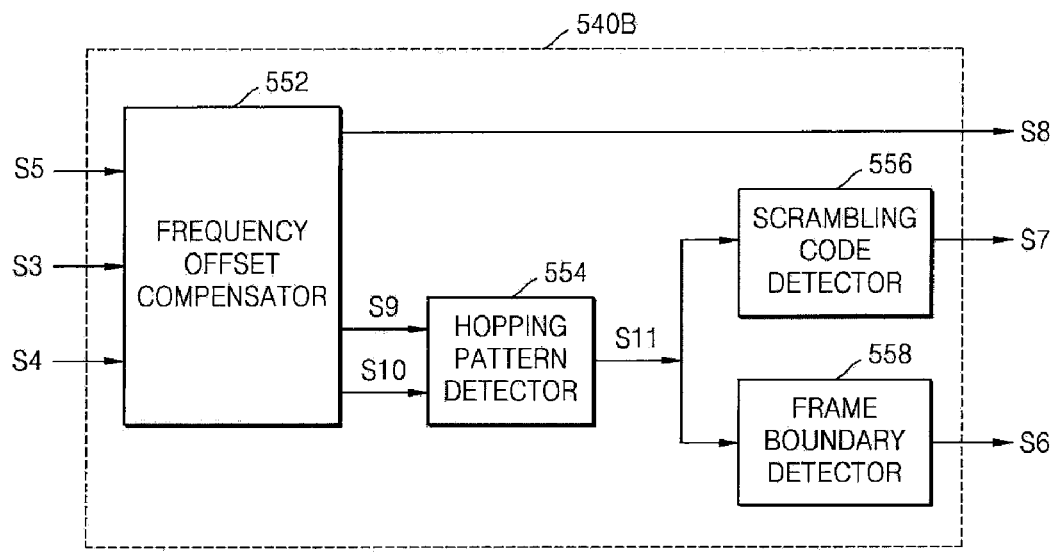

FIGS. 14 and 15 are block diagrams of the second detector 540 of the receiver illustrated in FIG. 10, according to an embodiment of the present invention. FIG. 14 is a block diagram of the second detector 540A according to the embodiment A, and FIG. 15 is a block diagram of the second detector 540B according to the embodiment B.

The second detector 540A includes a frequency offset compensator 542, a hopping pattern detector 544, a code group detector 546, and a frame boundary detector 548.

The frequency offset compensator 542 stores P×$N_S$ samples (642-A through 642-E) provided from each of the sync channel band filters 510-A and 510-B over several sync slot length durations based on the sync channel symbol timing 641-A and estimates a frequency offset S8 using the P×$N_S$ stored samples (642-A through 642-E). Thereafter, the frequency offset compensator 542 compensates for frequency offsets of the P×$N_S$ samples (642-A through 642-E) based on the estimated frequency offset S8 and provides the compensated P×$N_S$ signal samples S9 and S10 to the hopping pattern detector 544. Here, P denotes the number of sync channel symbols used for the hopping pattern detection and can be determined according to a condition of uniqueness to a cyclic shift operation and a limitation condition of the number of hits. For convenience of description, it is assumed that P is the number of sync channel symbols per frame (5 in FIG. 2).

Equations 6 and 7 illustrate frequency offset compensation methods of the frequency offset compensator 542. Equations 6 and 7 use the time domain repetition pattern of the sync channel symbols illustrated in FIG. 6. In particular, Equation 6 illustrates a frequency offset compensation method in a case where a transmitter end transmits a signal without carrying any data on DC subcarriers.

$$\Delta f = \frac{R_S}{\pi N_S} \tan^{-1}\left\{\sum_{a=0}^{A}\sum_{p=0}^{P-1}\sum_{n=0}^{\frac{N_S}{2}}\left\{r_{a,p}^*(n)r_{a,p}\left(n+\frac{N_S}{2}\right)\right\}\right\} \quad (6)$$

$$\Delta f = \frac{R_S}{\pi N_S} \tan^{-1}\left\{-\sum_{a=0}^{A-1}\sum_{p=0}^{P-1}\sum_{n=0}^{\frac{N_S}{2}}\left\{r_{a,p}^*(n)r_{a,p}\left(n+\frac{N_S}{2}\right)\right\}\right\} \quad (7)$$

Here, $R_S$ denotes an OFDM sampling frequency, A denotes the number of reception antennas, P denotes the number of sync channel symbols used for the frequency offset compensation, a denotes a reception antenna index, and $r_{a,p}(n)$ denotes an $n^{th}$ sample value of a $p^{th}$ reception sync channel symbol from the initial reference timing 641-A provided from the first detector 520 with respect to an $a^{th}$ reception antenna. Referring to FIG. 13, $r_{0,2}(n)$ denotes an $n^{th}$ sample among $N_S$ samples corresponding to reference numeral 642-B.

Equation 8 illustrates a frequency offset compensation method of the frequency offset compensator 542.

$$r'_{a,p}(n) = r_{a,p}(n) \times \exp\left\{-j2\pi\frac{\Delta f}{R_S}n\right\}, \quad (8)$$

$$n = 0, 1, 2, \ldots N_S - 1$$

$r'_{a,p}(n)$ is a result sample obtained by performing the frequency offset compensation of $r'_{a,p}(n)$. That is, the frequency offset compensator 542 compensates for frequency offsets of P×$N_S$ received samples as illustrated in FIG. 13 based on the frequency offset S8 estimated using the frequency offset compensation method illustrated in Equation 8. The frequency offset compensator 542 provides the frequency offset compensated P×$N_S$ samples S9 and S10 ($r'_{a,p}$) to the hopping pattern detector 544.

The hopping pattern detector 544 detects a hopping pattern of a target cell using the P×$N_S$ received samples S9 and S10 and provides hopping pattern information S11 corresponding to the detected hopping pattern to the code group detector 546 and the frame boundary detector 548. The code group detector 546 detects a code group of the target cell based on the hopping pattern information S11, and the frame boundary detector 548 detects a frame boundary based on the hopping pattern information S11.

The second detector 540B includes a frequency offset compensator 552, a hopping pattern detector 554, a scrambling code detector 556, and a frame boundary detector 558.

The embodiment illustrated in FIG. 15 is different from the embodiment illustrated in FIG. 14 in that the scrambling code detector 556 replaces the code group detector 546. That is, the scrambling code detector 556 detects a scrambling code of the target cell based on the hopping pattern information S11.

Figure 16:
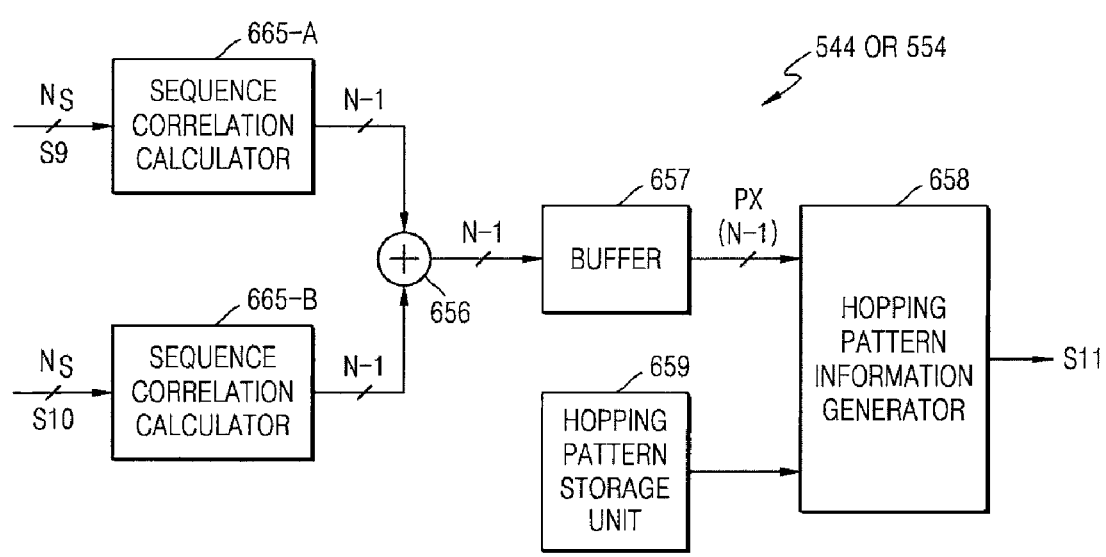
FIG. 16 is a block diagram of a hopping pattern detector illustrated in FIG. 14 or 15, according to an embodiment of the present invention.

FIG. 16 is a block diagram of the hopping pattern detector 544 or 554 illustrated in FIG. 14 or 15, according to an embodiment of the present invention. The hopping pattern detector 544 or 554 includes sequence correlation calculators 665-A and 665-B, a combiner 656, a buffer 657, a hopping pattern storage unit 659, and a hopping pattern information generator 658.

The sequence correlation calculator 665-A calculates correlation values of $N_S$ samples S9 of a reception sync channel symbol and all sync channel code sequences used by the OFDM cellular system. Likewise the sequence correlation calculator 665-B calculates correlation values of $N_S$ samples S10 of a reception sync channel symbol and all sync channel code sequences used by the OFDM cellular system. In the present specification, the correlation value of $N_S$ samples and each sync channel code sequence is called a sequence correlation value for convenience of description. That is, sequence correlation values corresponding to the number of sync channel code sequence used by the OFDM cellular system are calculated with respect to a single sync channel symbol.

Though the sequence correlation calculators 665-A and 665-B deal with different signals S9 and S10 due to respective reception antennas, the other signal processing process is the same for the sequence correlation calculators 665-A and 665-B. Thus, a detailed signal processing process will be described based on the sequence correlation calculator 665-A.

The sequence correlation calculator 665-A will now be described with reference to FIG. 13 and Equation 1. The sequence correlation calculator 665-A calculates N−1 sequence correlation values with respect to $N_S$ samples corresponding to reference numeral 642-A. Since the number of GCL sequences used in Equation 1 is N−1, N−1 sequence correlation values are calculated with respect to every $N_S$ samples of a single reception sync channel symbol. When the number P of reception sync channel symbols used to detect a hopping pattern is 5, N−1 sequence correlation values are calculated with respect to samples of each of reference numerals 642-B, 642-C, 642-D, and 642-E.

The combiner 656 combines N−1 sequence correlation values output from the sequence correlation calculator 665-A and N−1 sequence correlation values output from the sequence correlation calculator 665-B based on each sync channel code sequence. In the current embodiment, a simple summing method is used as a data combining method. That is, the combiner 656 provides N−1 combined sequence correlation values to the buffer 657 for every reception sync channel symbol. Since FIG. 16 is based on a case where the mobile station achieves reception diversity using two reception antennas, another embodiment of the present invention in which the reception diversity is not used does not include the combiner 656 and the sequence correlation calculator 665-B.

The buffer 657 buffers N−1 combined sequence correlation values of each of P reception sync channel symbols. That is, P×(N−1) combined sequence correlation values are stored in the buffer 657.

The hopping pattern storage unit 659 stores information regarding all hopping patterns used by the OFDM cellular system as illustrated in FIG. 4.

The hopping pattern information generator 658 detects a hopping pattern of a target cell by calculating a correlation value of each of the hopping patterns stored in the hopping pattern storage unit 659 ('658'을 '659'로 변경) and cyclically shifted results of the stored hopping patterns based on the P×(N−1) combined sequence correlation values and provides the hopping pattern information S11, which is information on the hopping pattern of the target cell, to a next stage. In the present specification, in order to distinguish correlation values of hopping patterns from sequence correlation values, the correlation values of hopping patterns are called hopping pattern correlation values for convenience of description. If the OFDM cellular system uses the hopping patterns illustrated in FIG. 4, the hopping pattern information generator 658 calculates 320 hopping pattern correlation values. According to an embodiment of the present invention, a hopping pattern correlation value corresponding to each hopping pattern is calculated by summing 5 sequence correlation values corresponding to 5 sync channel code sequence indexes included in the hopping pattern.

Figure 17:
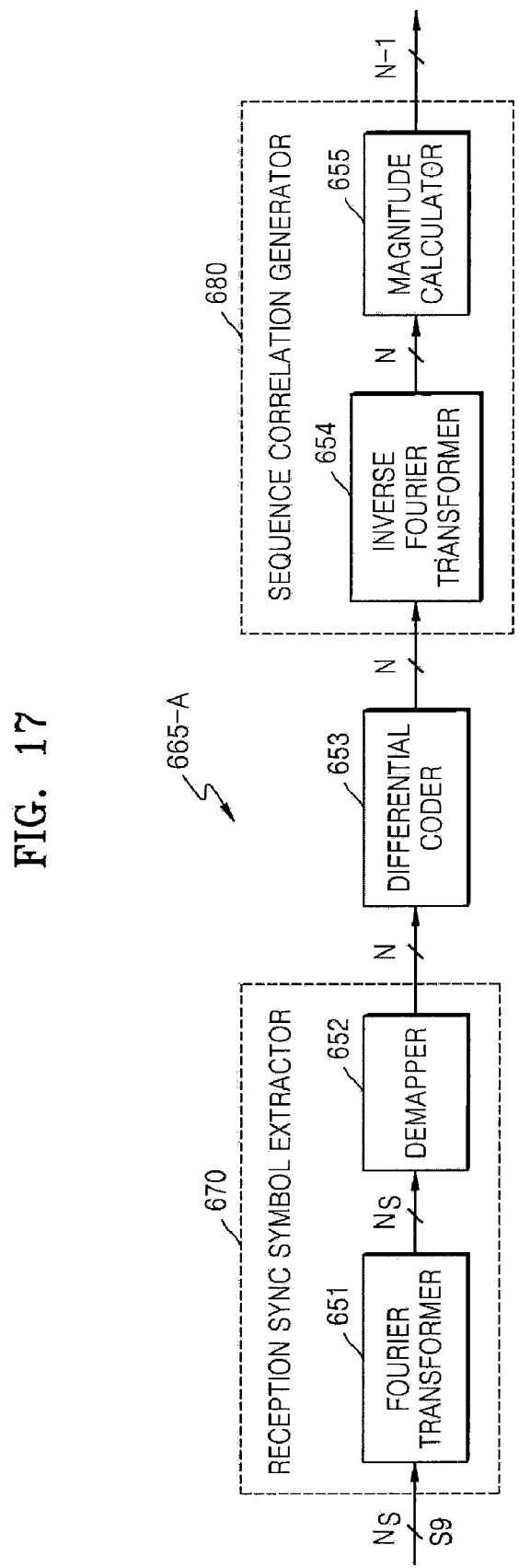
FIG. 17 is a block diagram of a sequence correlation calculator illustrated in FIG. 16, according to an embodiment of the present invention.

FIG. 17 is a block diagram of the sequence correlation calculator 665-A illustrated in FIG. 16, according to an embodiment of the present invention. The sequence correlation calculator 665-A includes a reception sync symbol extractor 670, a differential coder 653, and a sequence correlation generator 680. In particular, the current embodiment illustrates a configuration to calculate a correlation value in a case where a sync channel code sequence is achieved based on a GCL sequence.

The reception sync symbol extractor 670 extracts reception sync symbols from each reception sync channel symbol, each reception sync symbol being carried on a subcarrier on which a sync channel chip is carried from among subcarriers of each reception sync channel symbol. The reception sync symbol extractor 670 includes a Fourier transformer 651 and a demapper 652. The Fourier transformer 651 acquire $N_S$ data values by Fourier transforming the $N_S$ samples S9, and the demapper 652 extracts N reception symbols, i.e., N reception sync symbols, corresponding to subcarriers to which the sync channel chips are mapped from among the acquired $N_S$ data values.

The differential coder 653 performs differential encoding by multiplying a complex conjugate value of an odd-th reception sync symbol by a reception sync symbol adjacent to the odd-th reception sync symbol for every odd-th reception sync symbols of each reception sync channel symbol as defined by Equation 9.

$$u(n)=y^*(n)y((n+1)_{mod\,N}), n=0,1,\ldots,N-1 \quad (9)$$

Here, y(n) denotes an output of the demapper 652, and u(n) denotes an output of the differential coder 653. The differential encoding is performed so as to obtain only a linear phase transition corresponding to a GCL sequence index k from N frequency domain signal components. That is, if an environment in which channel distortion or noise does not exist is assumed, u(n) is represented by Equation 10.

$$u(n) = \exp\left\{-j2\pi\frac{n}{N}k\right\}, \quad n = 0, 1, \ldots, N-1 \quad (10)$$

In Equation 10, k denotes a GCL sequence index, which can have a value from 1 to N−1 as illustrated in Equation 1.

The sequence correlation generator 680 performs inverse Fourier transformation on multiplication results of each reception sync channel symbol and determines each sequence correlation value with each magnitude value of the inverse Fourier transformation result. The sequence correlation generator 680 includes an inverse Fourier transformer 654 and a magnitude calculator 655.

The inverse Fourier transformer 654 generates N complex samples per reception sync channel symbol by performing inverse Fourier transformation on the outputs, i.e., u(0), u(1), ..., u(N−1) of the differential coder 653. The magnitude calculator 655 calculates a magnitude value of a complex sample by summing a square of a real number component and a square of an imaginary number component for each of the generated N complex samples. In particular, according to an embodiment of the present invention, a first value of the calculated N magnitude values is discarded, and only the remaining N−1 magnitude values are provided to the combiner 656. That is, second through N-th magnitude values are sequence correlation values corresponding to GCL sequence indexes k=1 through N−1 in Equation 1.

Figure 18:
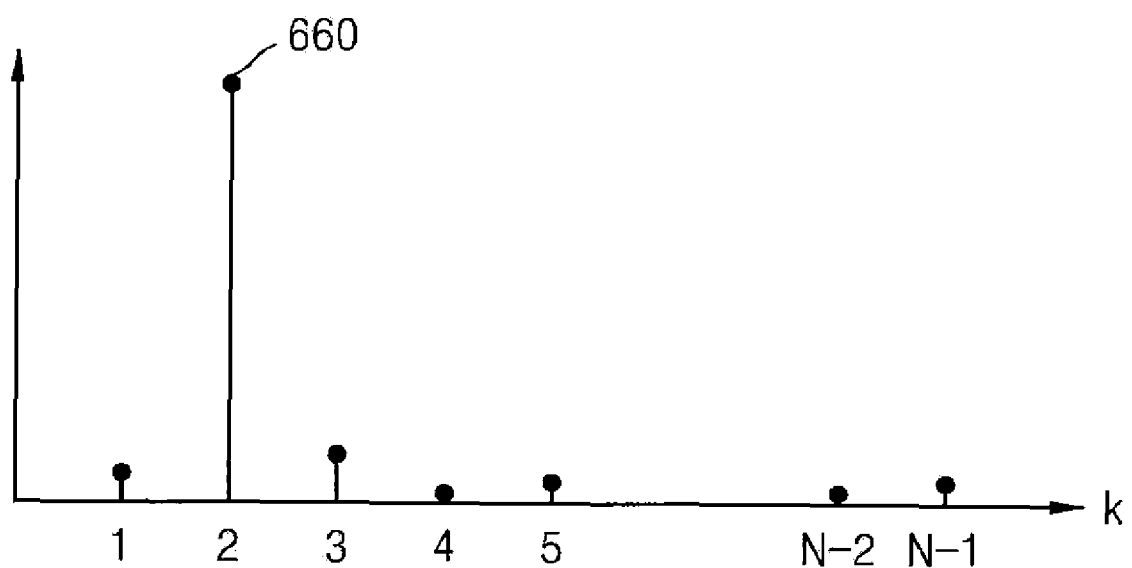
FIG. 18 is a graph illustrating sequence correlation values calculated from sample values of a single reception sync channel symbol according to an embodiment of the present invention.

FIG. 18 is a graph illustrating sequence correlation values calculated from sample values of a single reception sync channel symbol according to an embodiment of the present invention. That is, FIG. 18 is a graph illustrating outputs of the sequence correlation calculators 665-A and 665-B.

The horizontal axis represents GCL sequence indexes, and the vertical axis represents a sequence correlation value of a GCL sequence corresponding to each GCL sequence index. In particular, FIG. 18 illustrates an output of the sequence correlation calculator 665-A or 665-B when a target cell GCL sequence index k contained in the samples of the reception sync channel symbol is 2. Referring to FIG. 18, a sequence correlation value is largest when k is 2. In particular, if channel distortion or noise does not exist, sequence correlation values excluding a case where k is 2 are 0 which is different from the illustration of FIG. 18.

Figure 19:
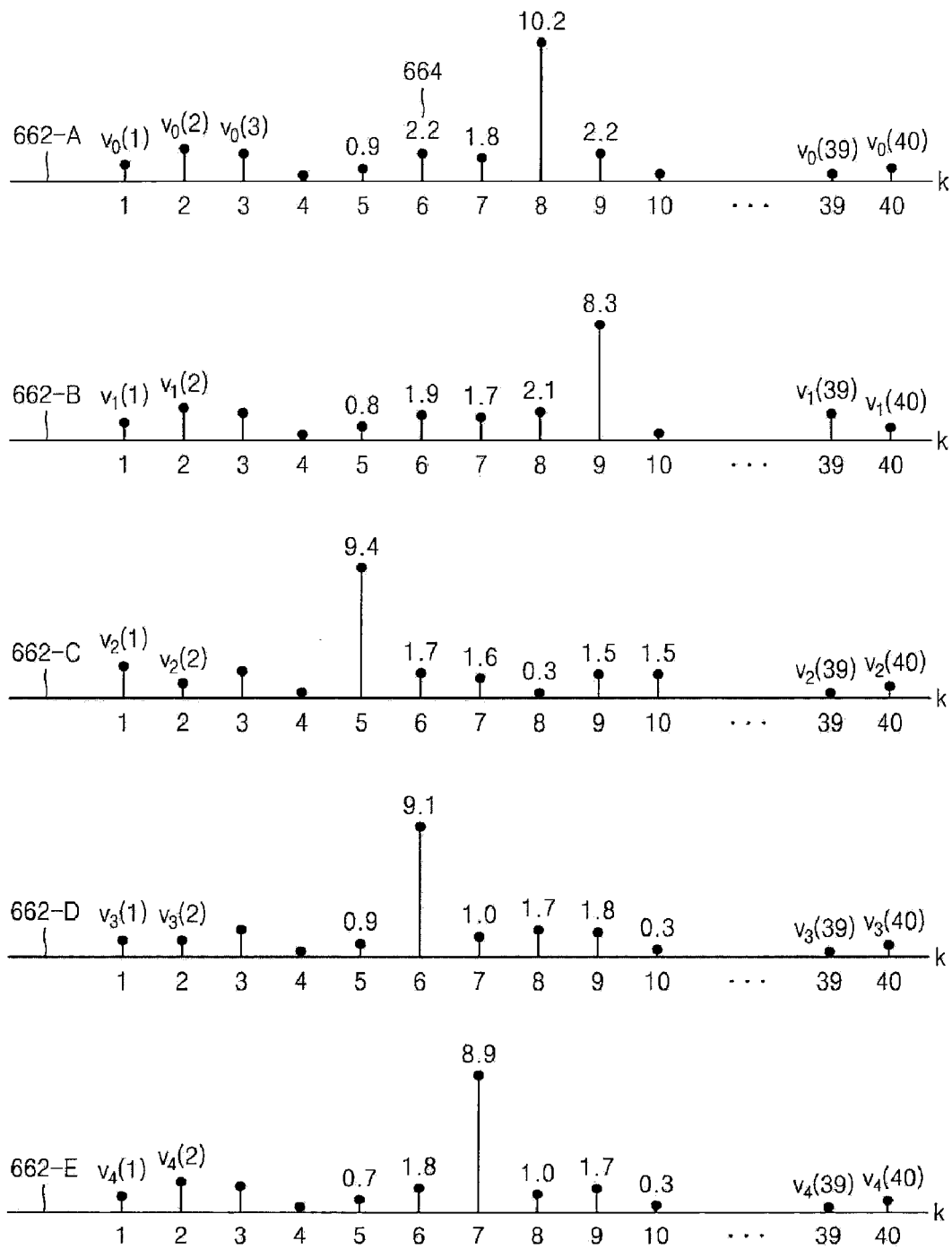
FIG. 19 illustrates P×(N−1) sequence correlation values stored in a buffer illustrated in FIG. 16 when P=5 and N=41, according to an embodiment of the present invention.

FIG. 19 illustrates P×(N−1) sequence correlation values stored in the buffer 657 illustrated in FIG. 16 when P=5 and N=41, according to an embodiment of the present invention. That is, FIG. 19 shows graphs illustrating sequence correlation values calculated from samples of each of reception sync channel symbols corresponding to p=0, 1, 2, 3, and 4 from the top.

In each graph, the horizontal axis represents GCL sequence indexes, and the vertical axis represents sequence correlation values.

The graphs illustrated in FIG. 19 will now be described with reference to FIG. 13. Reference numeral 662-A indicates N−1 sequence correlation values calculated using $N_S$ samples corresponding to reference numeral 642-A, i.e., an output of the combiner 656, and reference numeral 662-B indicates N−1 sequence correlation values calculated using $N_S$ samples corresponding to reference numeral 642-B. Reference numerals 662-C, 662-D, and 662-E are described as well.

The hopping pattern information generator 658 calculates $N_G \times P$ hopping pattern correlation values using the P×(N−1) sequence correlation values and provides a hopping pattern correlation index corresponding to the maximum hopping pattern correlation value to next stages as the hopping pattern information S11. The next stages are the code group detector 546 and the frame boundary detector 548 according to the embodiment A or the scrambling code detector 556 and the frame boundary detector 558 according to the embodiment B. $N_G \times P$ denotes the number of hopping patterns which can be obtained considering a cyclic shift operation, and the hopping pattern correlation index has a value of one of 0 through $N_G \times P-1$. Here, $N_G$ denotes the number of hopping patterns used in the system, and P denotes the number of sync channel code sequences included in a single hopping pattern. According to FIG. 4, $N_G=64$, and P=5.

A hopping pattern correlation value q(i) corresponding to a hopping pattern correlation index according to an embodiment of the present invention is represented by Equation 11.

$$q(i) = \sum_{p=0}^{P-1} v_p(h_{\lfloor i/P \rfloor}((i_{modP} + p)_{modP})), \quad (11)$$

$$i = 0, 1, \ldots, P \times N_G - 1$$

Here, mod denotes a modular operator, $\lfloor x \rfloor$ denotes the maximum value out of integers equal to or less than x, and $h_x(y)$ denotes a $y^{th}$ sync channel code sequence index of a hopping pattern whose hopping pattern ID is x. For example, when $h_0(2)$ is 7 with reference to FIG. 4. $v_p(k)$ is a sequence correlation value corresponding to a sequence index k from among N−1 sequence correlation values calculated using a $p^{th}$ reception sync channel symbol. FIG. 19 illustrates P×(N−1) sequence correlation values such as $v_0(8)=12$, $v_2(10)=1.5$, etc.

Referring to FIG. 4, a hopping pattern correlation value corresponding to a hopping pattern (5, 6, 7, 8, 9) whose hopping pattern ID is 0 is q(0), and a hopping pattern correlation value corresponding to a hopping pattern (9, 5, 6, 7, 8), which is "1" cyclically shifted from the hopping pattern (5, 6, 7, 8, 9), is q(1). That is, a hopping pattern correlation index i corresponding to a result, which is "p" cyclically shifted from a hopping pattern whose hopping pattern ID is m, is m×P+p.

A process of calculating q(i) by referring to FIGS. 19 and 4 will now be described in detail. q(0) is a hopping pattern correlation value of a hopping pattern (5, 6, 7, 8, 9) whose hopping pattern ID m is 0 and cyclic shift index p is 0, i.e., q(0)=0.9+1.9+1.6+1.7+1.7=7.8. Likewise, q(2) is a hopping pattern correlation value of a hopping pattern (8, 9, 5, 6, 7) whose hopping pattern ID m is 0 and cyclic shift index p is 2, i.e., q(2)=10.2+8.3+9.4+9.1+8.9=45.9. Through this process, q(0), q(1), through to q(P×$N_G$−1) are calculated, and if q(2) has the maximum value, the hopping pattern information generator 658 provides hopping pattern information "$i_{max}=2$" to a next stage. Here, $i_{max}=\max_i q(i)$. According to the embodiment A, using the characteristic that each hopping pattern respectively correspond to each code group, the code group detector 546 detects a code group of a target cell based on a result of an operation $\lfloor i_{max} \div P \rfloor$. Likewise, according to the embodiment B, using the characteristic that each hopping pattern respectively correspond to each scrambling code, the scrambling code detector 556 detects a scrambling code of the target cell based on the result of the operation $\lfloor i_{max} \div P \rfloor$. This is because the result of the operation $\lfloor i_{max} \div P \rfloor$ is a hopping pattern ID of the target cell.

The frame boundary detector 548 or 558 can determine one of 5 frame boundary candidates 641-A, 641-B, 641-C, 641-D, and 641-E illustrated in FIG. 13 as a frame boundary based on a cyclic shift index which is a result of a modular operation $(i_{max})_{mod\ P}$. If the cyclic shift index is 2, the frame boundary detector 548 or 558 determines a position of reference numeral 642-C as a frame boundary. That is, a cyclic shift index is information indicating how far a frame boundary separates from the initial reference timing 641-A in sync slot length units.

Figure 20:
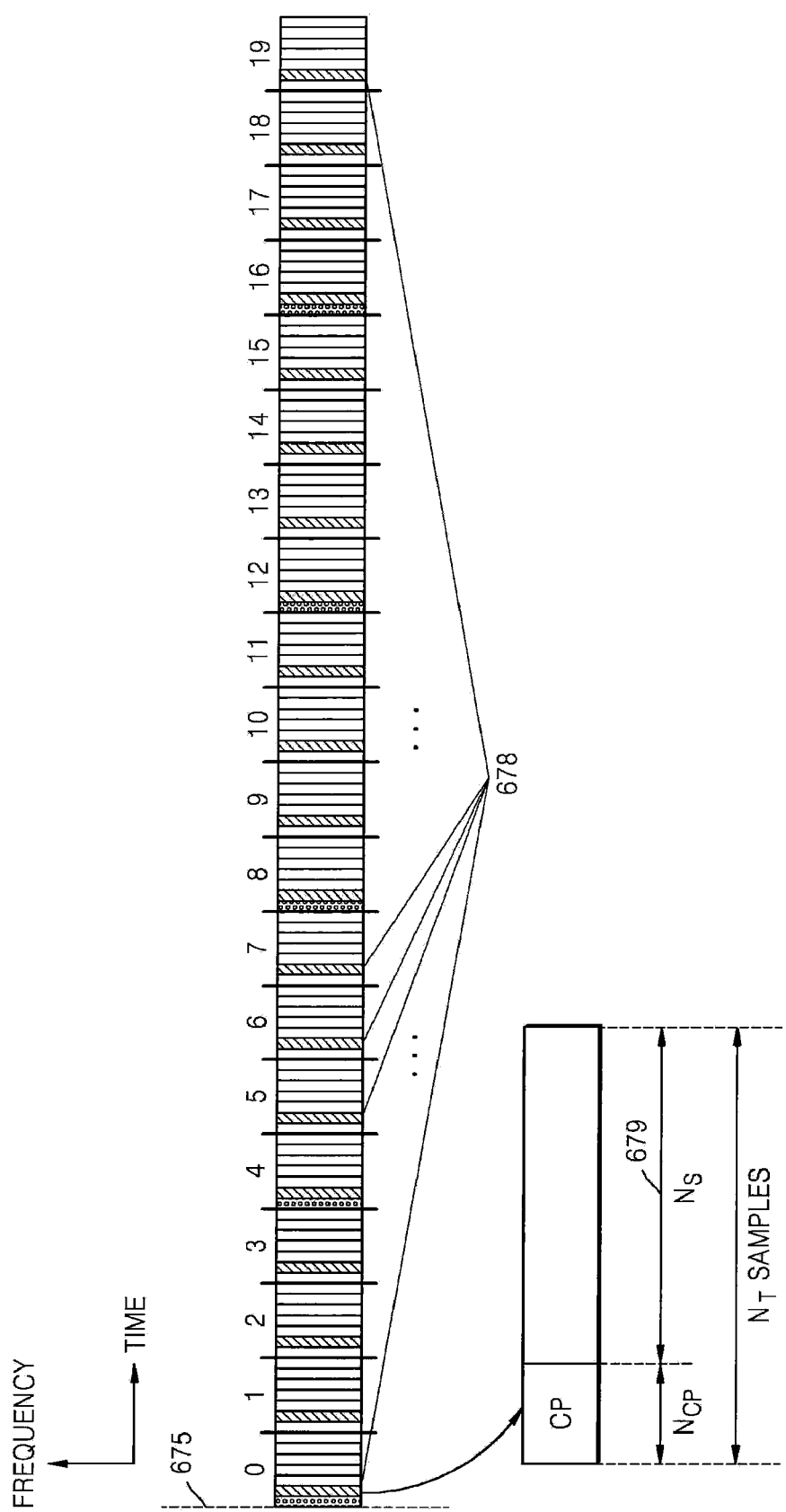
FIG. 20 is a conceptual diagram for explaining positions of frame boundaries and reception common pilot channel symbols according to an embodiment of the present invention.

FIG. 20 is a conceptual diagram for explaining positions of a frame boundary and reception common pilot channel symbols according to an embodiment of the present invention. Referring to FIG. 20, each reception common pilot channel symbol includes $N_T$ samples as other OFDM symbols, including a CP duration having $N_{CP}$ samples and a remainder duration 679 having $N_S$ samples.

Reference numeral 675 denotes a frame boundary detected by the second detector 540. Since a forward link frame according to an embodiment of the present invention has common pilot channel symbols according to a predetermined rule based on the frame boundary, the third detector 580 can extract reception common pilot channel symbols from received signals S1 and S2 based on frame boundary information S6 received from the second detector 540 and the predetermined rule. That is, the third detector 580 extracts reception common pilot channel symbols referred to as reference numeral 678 based on the frame boundary referred to as reference numeral 675 corresponding to the frame boundary information S6. Thereafter, the third detector 580 performs scrambling code detection according to the embodiment A or a verification process according to the embodiment B by applying a pilot correlation to each of the extracted reception common pilot channel symbols.

In detail, according to the embodiment B-2, the third detector 580 calculates a pilot correlation value of each of the reception common pilot channel symbols and a scrambling code corresponding to scrambling code information S7, compares the calculated pilot correlation value to a predetermined threshold, and determines whether a detection result of the first detector 520 and a detection result of the second detector 540.

In detail, according to the embodiment A, the third detector 580 calculates pilot correlation values of each of the reception common pilot channel symbols and scrambling codes belonging to a code group corresponding to code group information S7 and determines a scrambling code corresponding to the maximum pilot correlation value from among the calculated pilot correlation values as a scrambling code of a target cell. The embodiment A induces an effect that complexity of the receiver can be reduced, by searching for only scrambling codes belonging to a detected code group. That is, the third detector 580 can determine the scrambling code of the target cell by searching for only $N_c=8$ scrambling codes from among a total of 512 scrambling codes with reference to FIG. 1. Here, $N_c$ denotes the number of scrambling codes per code group.

Figure 21:
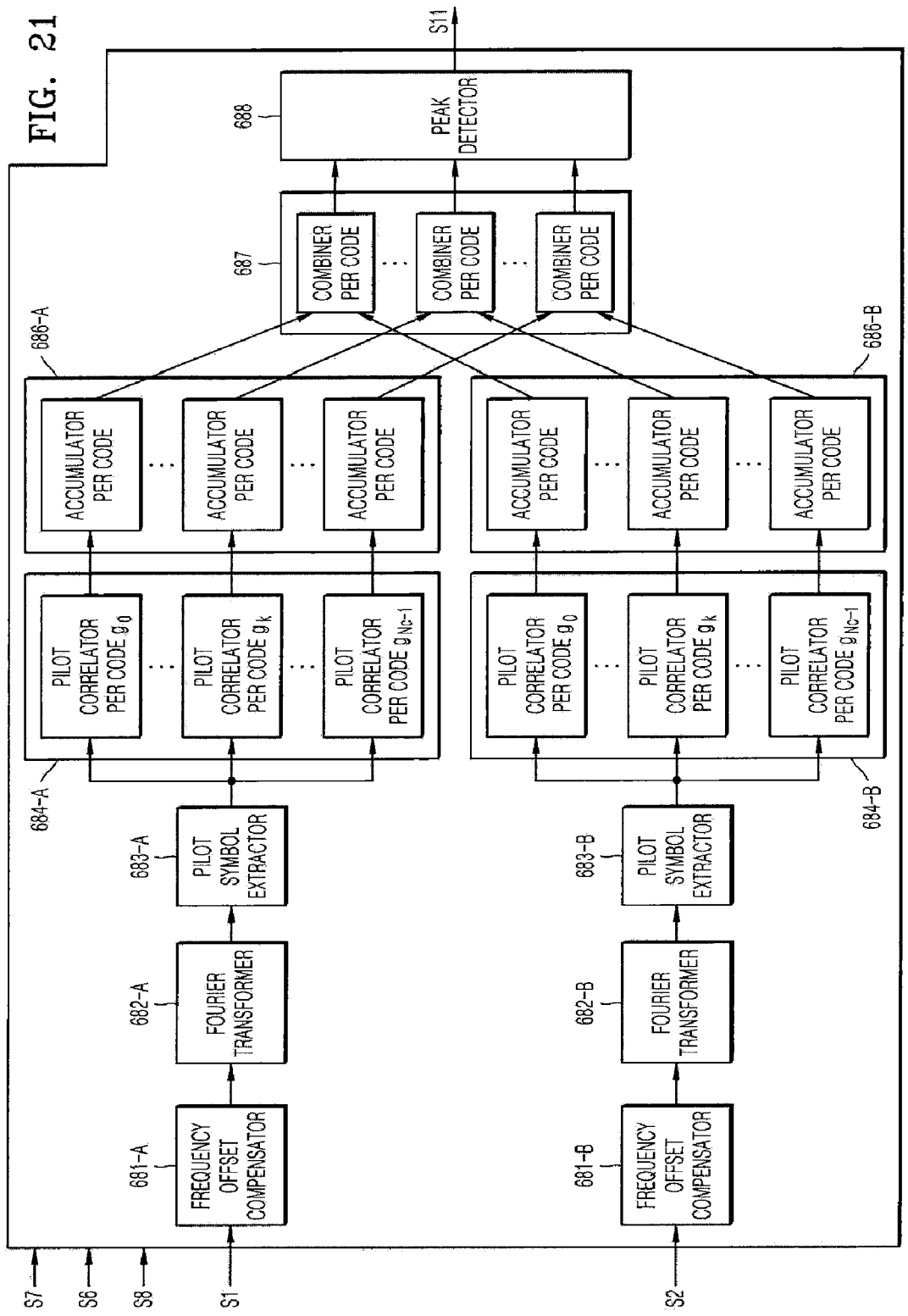
FIG. 21 is a block diagram of a third detector of the receiver illustrated in FIG. 10, according to an embodiment of the present invention.

FIG. 21 is a block diagram of the third detector 580 of the receiver illustrated in FIG. 10, according to an embodiment of the present invention. Referring to FIG. 21, the third detector 580 includes frequency offset compensators 681-A and 681-B, Fourier transformers 682-A and 682-B, pilot symbol extractors 683-A and 683-B, pilot correlators 684-A and 684-B, accumulators 686-A and 686-B, a combiner 687, and a peak detector 688.

Since each of the frequency offset compensators 681-A and 681-B can detect the common pilot channel symbol duration 678 of each sub-frame based on the frame boundary information S6 received from the second detector 540, each of the frequency offset compensators 681-A and 681-B extracts a reception common pilot channel symbol from the down-converted signals S1 or S2 and frequency offset compensates the $N_S$ samples 679 excluding the CP of samples of the common pilot channel symbols using Equation 8. Here, the frequency offset estimation value S8 received from the second detector 540 can be used for the frequency offset compensation according to the current embodiment.

Each of the Fourier transformers 682-A and 682-B performs Fourier transformation on the $N_S$ frequency offset compensated samples. Each of the pilot symbol extractors 683-A and 683-B extracts $N_P$ reception pilot symbols from the Fourier transformed signal. Here, referring to FIG. 3, the reception pilot symbols indicate reception symbols corresponding to subcarriers to which the pilot symbols 182 are mapped from among the $N_S$ reception symbols included in the Fourier transformed signal.

Each of the pilot correlators 684-A and 684-B calculates pilot correlation values of the extracted $N_P$ reception pilot symbols and each of the $N_c$ scrambling codes corresponding to the code group information S7. Here, a pilot correlation method (a method of calculating the pilot correlation values) can be represented by Equations 12 through 15 which will be described later. Each of the pilot correlators 684-A and 684-B includes $N_c$ pilot correlators per code calculating $N_c$ pilot correlation values in a parallel method. In FIG. 21, $g_0$, $g_1, \ldots g_{N_c-1}$ indicate scrambling code IDs of $N_c$ scrambling codes corresponding to the code group information S7.

An output of each of the $N_c$ pilot correlators per code is accumulated in each accumulator-per-code included in the accumulators 686-A and 686-B for every sub-frame. Referring to FIG. 2, since one reception common pilot channel symbol per sub-frame exists, each accumulator-per-code accumulates pilot correlation values corresponding to each scramble code, which correspond to a pre-set number of sub-frames.

The combiner 687 including $N_c$ combiner-per-codes generates $N_c$ decision variables in a parallel method by combining outputs of the accumulator-per-codes in two data paths corresponding the same scrambling code. Here, the two data paths are paths occurring according to the reception diversity as described above. It will be understood by those of ordinary skill in the art that the combiner 687 and the blocks in the lower part can be omitted if reception diversity is not used. The peak detector 688 detects a scrambling code S11 of a target cell by detecting a scrambling code corresponding to a decision variable having the maximum value out of the $N_c$ decision variables provided by the combiner 687. Through this process, the mobile station can detect a scrambling code of a base station having the shortest radio distance or a base station providing the highest reception signal intensity to the mobile station.

Though a detailed configuration of the third detector 570 according to the embodiment A has been described in FIG. 21, It will be understood by those of ordinary skill in the art that a detailed configuration of the third detector 570 according to the embodiment B-2 can be derived from the above description.

Figure 22:
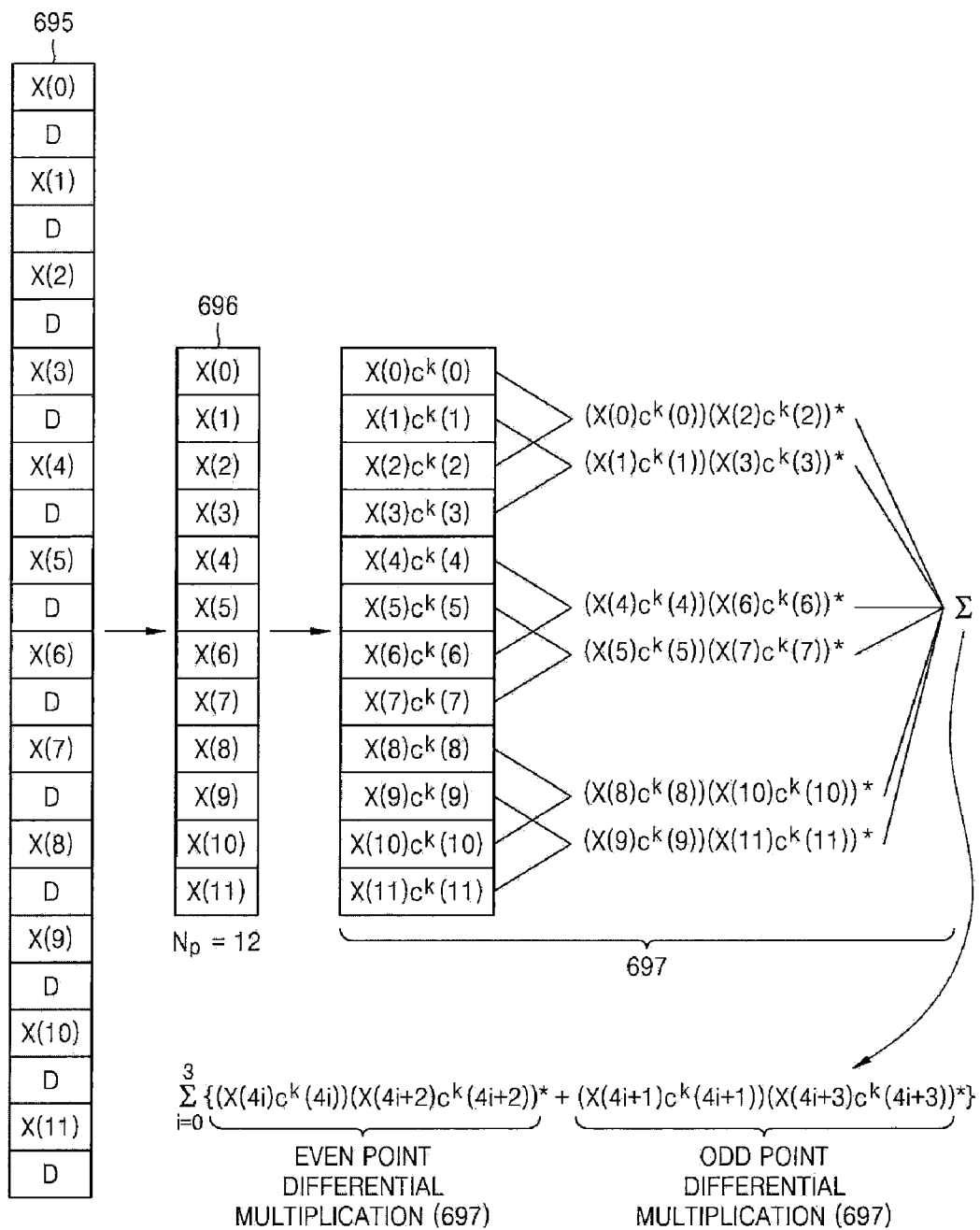
FIG. 22 is a conceptual diagram for explaining an operation of a pilot correlator illustrated in FIG. 21, according to an embodiment of the present invention.

FIG. 22 is a conceptual diagram for explaining an operation of the pilot correlator 684-A or 684-B illustrated in FIG. 21, according to an embodiment of the present invention.

Referring to FIG. 22, reference numerals 695 and 696 respectively denote an input and an output of the pilot symbol extractors 683-A or 683-B. That is, the signal corresponding to reference numeral 695 includes reception pilot symbols and reception data symbols in a frequency domain. In this case, referring to FIG. 3, the reception pilot symbols indicate reception symbols corresponding to subcarriers on which pilot symbols 182 are carried from among the reception symbols referred to as reference numeral 695. The pilot symbol extractor 683-A or 683-B extracts $N_P$ reception pilot symbols from the signal referred to as reference numeral 695. In FIG. 22, X(n) denotes an $n^{th}$ reception pilot symbol in the frequency domain, and $N_P$=12.

Equations 12 through 15 represent a pilot correlation method.

$$\sum_{i=0}^{N-1} \{(X(i)(c_{g_k}(i))^*)\} \quad (12)$$

$$\sum_{i=0}^{\frac{N}{2}-1} \{(X(2i)(c_{g_k}(2i))^*)(X(2i+1)(c_{g_k}(2i+1))^*)^*\} \quad (13)$$

$$\sum_{i=0}^{\frac{N_P}{4}-1} \left\{ \begin{array}{l} (X(4i)(c_{g_k}(4i))^*)(X(4i+2)(c_{g_k}(4i+2))^*)^* + \\ (X(4i+1)(c_{g_k}(4i+1))^*)(X(4i+3)(c_{g_k}(4i+3))^*)^* \end{array} \right\} \quad (14)$$

$$\sum_{i=0}^{\frac{N_P}{4}-1} \{(X(4i)(c_{g_k}(4i))^*)(X(4i+2)(c_{g_k}(4i+2))^*)^*\} \quad (15)$$

Here, $c_{g_k}(u)$ denotes a $u^{th}$ element of a scrambling code whose scrambling code ID is $g_k$. In Equations 12 through 15, $X(i)=a_i c(i)$. Here, $a_i$ denotes a channel frequency response of an $i^{th}$ subcarrier, and c(i) denotes an element of a scrambling code mapped to a subcarrier in a transmitter end.

A fading channel has a characteristic in that channel frequency response values are almost the same for adjacent subcarriers but different from each other for subcarriers far from each other. Equation 12 becomes $$\sum_{i=0}^{N-1} a_i,$$

and thus, a wireless fading effect is coherently added for symbols X( ) far from each other in the frequency domain. Thus, the detection performance of the conventional pilot correlation method defined by Equation 12 is decreased in the fading channel, and significantly decreased if a correlation length N is large.

However, Equations 13 through 15 represent the differential correlation. For example, Equation 13 becomes $$\sum_{i=0}^{\frac{N}{2}-1} a_{2i} a_{2i+1}^* \approx \sum_{i=0}^{\frac{N}{2}-1} |a_{2i}|^2,$$

and thus a better performance can be achieved than the conventional pilot correlation method defined by Equation 12.

Unlike Equation 13 using differential multiplication between adjacent reception pilot symbols, Equation 14 uses differential multiplication between every other reception pilot symbols as referred to as reference numeral 697 of FIG. 22. The pilot correlation method defined by Equation 14 may be advantageous in an initial cell search mode in which the mobile station cannot know whether the number of transmission antennas of a base station is 1 or 2.

If the number of transmission antennas of a target base station is 2, the target base station transmits even-th pilot symbols through a first transmission antenna and odd-th pilot symbols through a second transmission antenna, and thus pilot symbols that are adjacent in the frequency domain undergo fully independent fading. In FIG. 22, X(0), X(2), . . . are reception pilot symbols corresponding to the even-th pilot symbols, and X(1), X(3), . . . are reception pilot symbols corresponding to the odd-th pilot symbols. Thus, if the number of transmission antennas is 2, when the mobile station performs differential multiplication between adjacent reception pilot symbols as in Equation 13, detection performance may be decreased. However, if Equation 14 is used, as illustrated by reference numeral 697 of FIG. 22, differential multiplication 697-A between even-th reception pilot symbols and differential multiplication 697-B between odd-th reception pilot symbols are performed, and thus scrambling code detection performance can be increased regardless of whether the number of transmission antennas of the target base station is 1 or 2. In order to reduce calculation complexity, Equation 14 can be replaced by Equation 15 by using only the even-th reception pilot symbols and ignoring the odd-th reception pilot symbols.

When the mobile station is turned on, an error of the clock generator 440 may be 3 pulses per million (PPM) or more. If this error is converted to a value used in a 2 GHz band, the error is 6 KHz or more. If a frequency offset is large in the initial cell search process, the search performance in the first detection step may be significantly decreased. There is no performance problem in the second and third detection steps since frequency offset compensation is performed.

Figure 23:
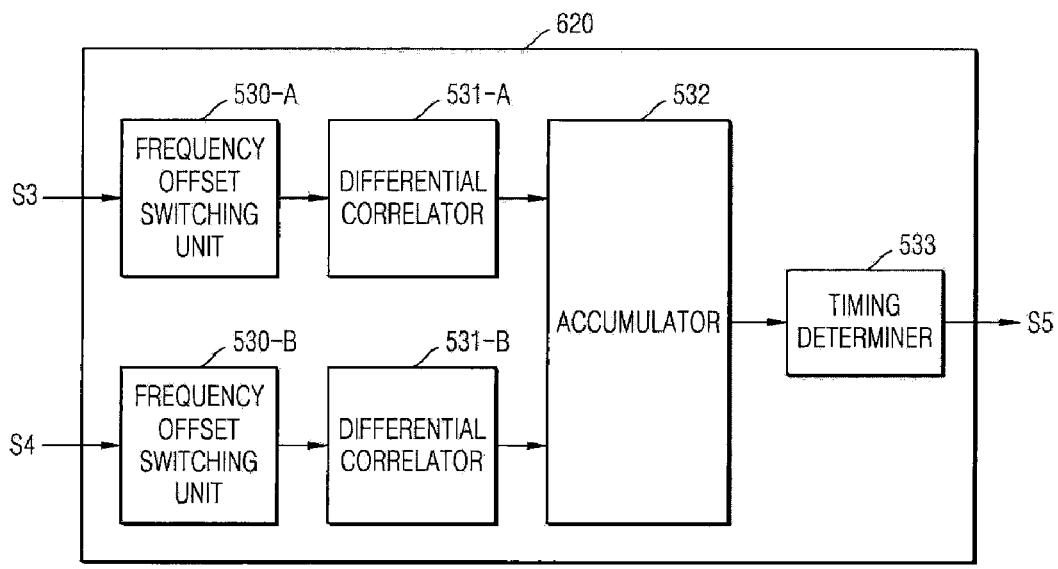
FIG. 23 is a block diagram of the first detector of the receiver illustrated in FIG. 10, according to another embodiment of the present invention.

FIG. 23 is a block diagram of the first detector 520 of the receiver illustrated in FIG. 10, according to another embodiment of the present invention. Referring to FIG. 23, the first detector 520 includes frequency offset switching units 530-A and 530-B, differential correlators 531-A and 531-B, an accumulator 532, and a timing determiner 533. Since functions and operations of the differential correlators 531-A and 531-B, the accumulator 532, and the timing determiner 533 are the same as those illustrated in FIG. 11, a detailed description thereof is omitted, and only the frequency offset switching units 530-A and 530-B will be described.

If a correlation operation handling absolute values is performed as in Equation 3 or 4, no decrease of detection performance according to a frequency offset can be considered. However, if a general correlation operation different from Equation 3 or 4 is performed, the frequency offset switching units 530-A and 530-B according to an embodiment of the present invention may be further included.

The frequency offset switching unit 530-A or 530-B multiplies an input signal r(n) by an arbitrary frequency offset component as in Equation 16, wherein a different offset value is used in every unit duration during the first detection step (hereinafter, a first detection unit duration). r'(n) denotes an output signal of the frequency offset switching unit 530-A or 530-B and is an object of the differential correlation operation.

$$r'(n) = r(n) \times \exp\left\{-j2\pi\frac{\Delta f_s}{R_s}n\right\}, \quad n = 0, 1, 2, \ldots \quad (16)$$

Figure 24:
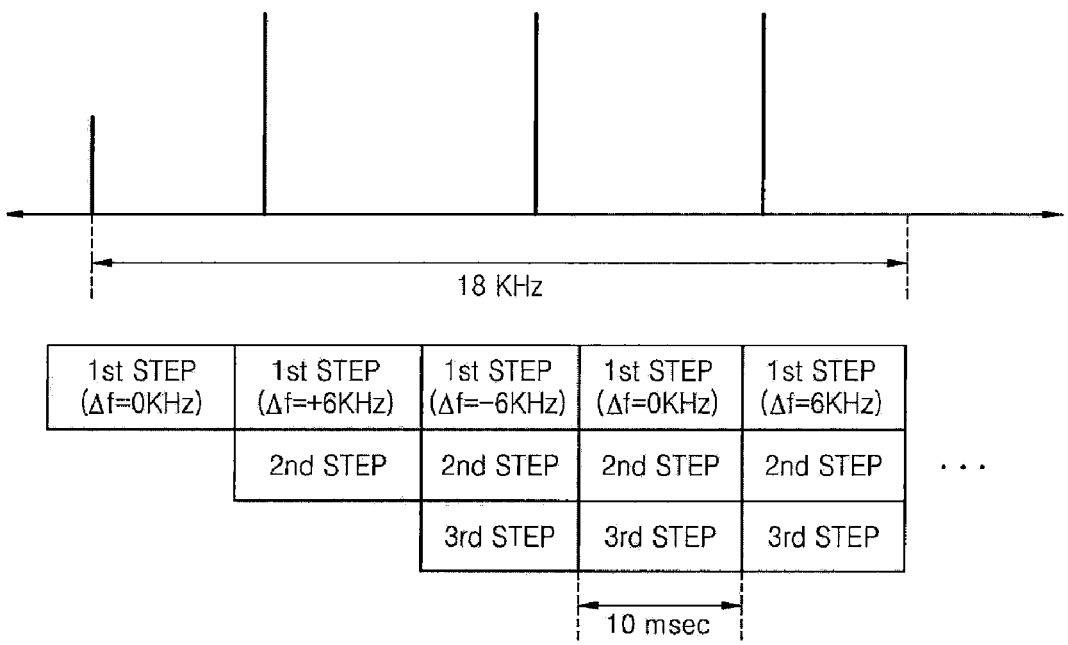
FIG. 24 is a conceptual diagram for explaining an operation of a frequency offset switching unit illustrated in FIG. 23, according to an embodiment of the present invention.

FIG. 24 is a conceptual diagram for explaining an operation of the frequency offset switching unit 530-A or 530-B illustrated in FIG. 23, according to an embodiment of the present invention.

FIG. 24 illustrates frequency offsets values used by the frequency offset switching unit 530-A or 530-B, and the frequency offset values are 0 KHz, −6 KHz, and 6 KHz. In FIG. 24, five 10-msec cell search unit durations are shown. The first detector 520 can safely operate even with an initial frequency offset of more than 18 KHz by using the frequency offset switching method illustrated in FIG. 24.

Figure 25:
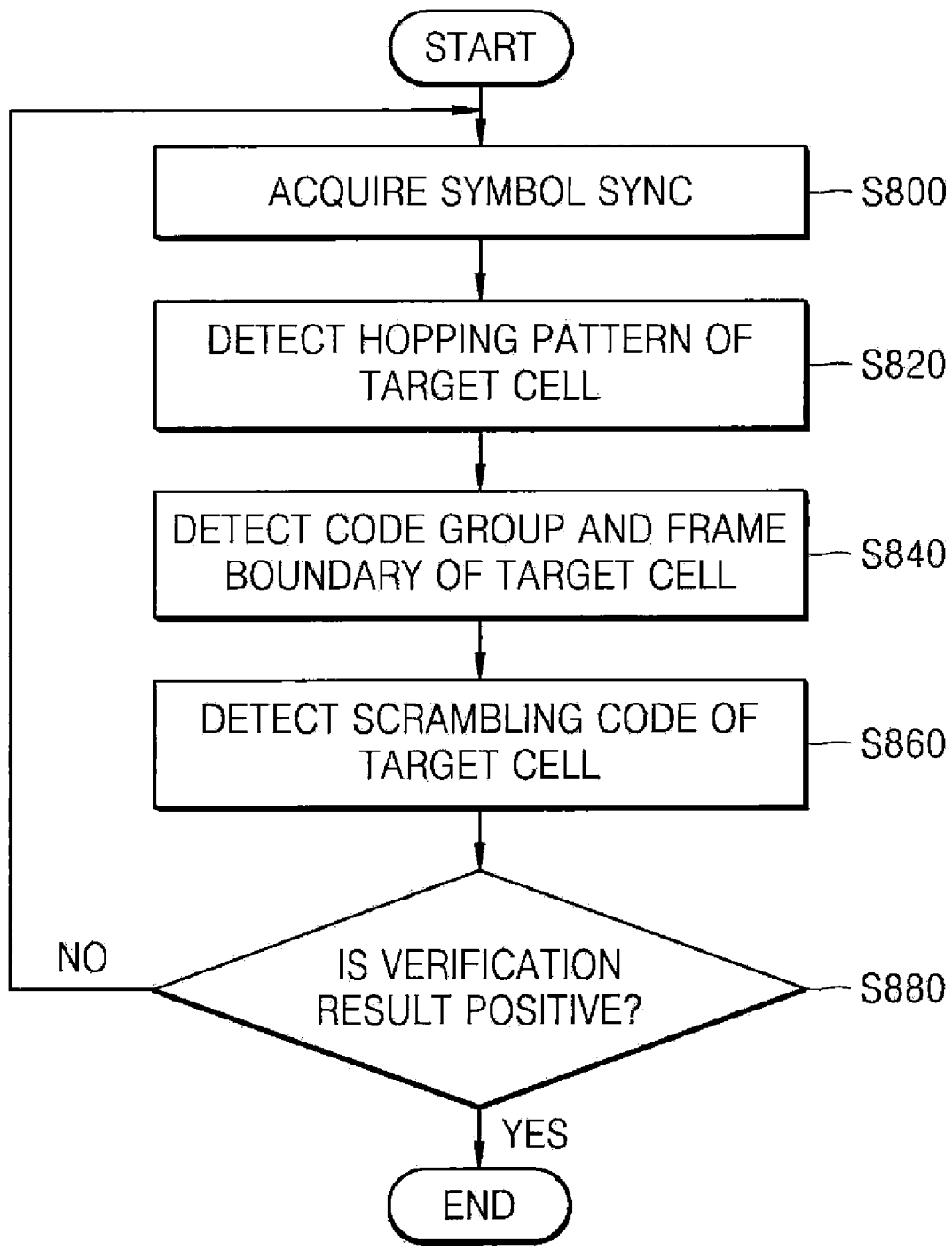
FIG. 25 is a flowchart illustrating a cell search method according to an embodiment of the present invention.

FIG. 25 is a flowchart illustrating a cell search method according to an embodiment of the present invention, which corresponds to the embodiment A in which each hopping pattern respectively corresponds to each code group.

The cell search method of a mobile station according to the current embodiment includes operations sequentially processed by the cell search unit 500 illustrated in FIG. 10 according to the embodiment A. Thus, although not fully described, the contents relating to the cell search unit 500 illustrated in FIG. 10 also apply to the cell search method according to the current embodiment.

Referring to FIG. 25, symbol synchronization is acquired from a reception signal in operation S800. Here, the reception signal is a signal received by the mobile station when each base station transmits a frame of its cell. As described above, a frame of each cell includes M sync channel symbols code-hopped according to a hopping pattern of the cell and includes at least one common pilot channel symbol scrambled with a scrambling code of the cell. An arbitrary hopping pattern used in the OFDM cellular system according to the present embodiment differs from a cyclically shifted result of the hopping pattern, other hopping patterns, or cyclically shifted results of the other hopping patterns.

A signal processing method used in operation S800 varies according to a forward link frame structure and a sync channel structure. For example, the time domain repetition pattern detection method and the matching filter method described above can be used for the signal processing method.

In operation S820, hopping pattern correlation values are calculated using reception sync channel symbols extracted from the reception signal based on the acquired symbol synchronization information, and a hopping pattern of a target cell is detected based on the calculated hopping pattern correlation values. A signal processing method used in operation S820 is the same as described for the second detector 540.

In operation S840, a code group and a frame boundary of the target cell are detected based on the detected hopping pattern. As described above, the code group of the target cell is a code group respectively corresponding to the detected hopping pattern, and the frame boundary is determined based on a cyclic shift index of the detected hopping pattern. A signal processing method used in operation S840 is the same as described above.

In operation S860, pilot correlation values of the common pilot channel symbol and each scrambling code belonging to the detected code group are calculated, and a scrambling code of the target cell is detected based on the calculated pilot correlation values.

In operation S880, a verification process is performed to determine whether the detection result of operations S800 through S860 is reliable, and if the verification result is negative, the process proceeds to operation S800 and performs a cell search using a subsequent observing duration. If the verification result is positive, the cell search process according to an embodiment of the present invention ends. For example, the verification result is negative if a pilot correlation value corresponding to the scrambling code of the target cell is less than a predetermined threshold. Though not shown in FIG. 25, it will be understood by those of ordinary skill in the art that a fine tuning operation for fine tuning frequency and timing can be further included after operation S860, and the verification process of operation S880 can be omitted for a quick cell search.

Figure 26:
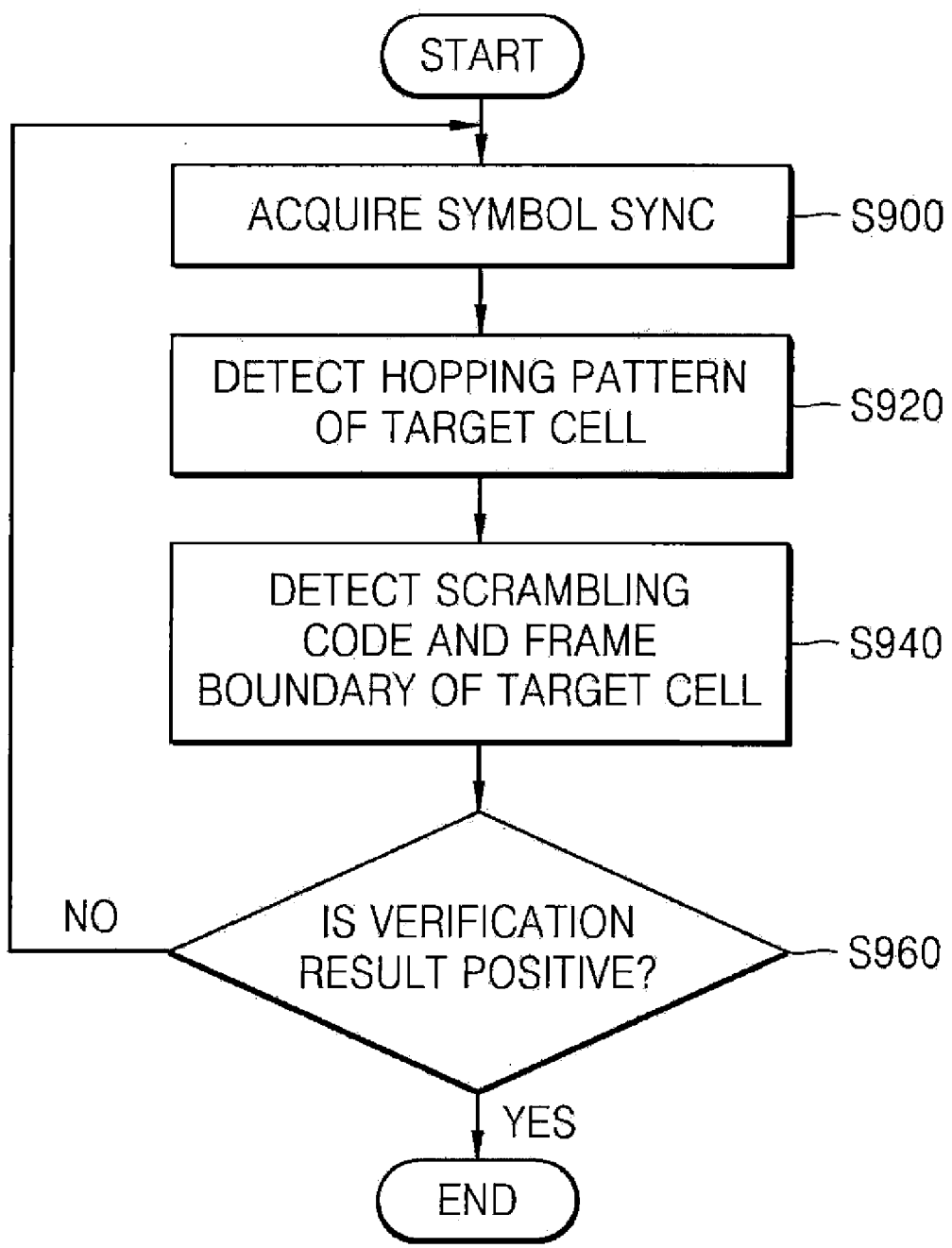
FIG. 26 is a flowchart illustrating a cell search method according to another embodiment of the present invention.

FIG. 26 is a flowchart illustrating a cell search method according to another embodiment of the present invention, which corresponds to the embodiment B in which each hopping pattern respectively corresponds to each scrambling code.

The cell search method of a mobile station according to the current embodiment includes operations sequentially processed by the cell search unit 500 illustrated in FIG. 10 according to the embodiment B. Thus, although not fully described, the contents relating to the cell search unit 500 illustrated in FIG. 10 also apply to the cell search method according to the current embodiment.

In the current embodiment, a frame of each cell includes M sync channel symbols code-hopped according to a hopping pattern of the cell and includes at least one common pilot channel symbol scrambled with a scrambling code of the cell. An arbitrary hopping pattern used in the OFDM cellular system according to the present embodiment differs from a cyclically shifted result of the hopping pattern, other hopping patterns, or cyclically shifted results of the other hopping patterns.

Since operation S900 to acquire symbol synchronization and operation S920 to detect a hopping pattern are the same as operations S800 and S820, a detailed description is omitted.

In operation S940, a scrambling code and a frame boundary of the target cell are detected based on the detected hopping pattern. As described above, the scrambling code of the target cell is a scrambling code respectively corresponding to the detected hopping pattern, and the frame boundary is determined based on a cyclic shift index of the detected hopping pattern. A signal processing method used in operation S940 is the same as described above.

In operation S960, a verification process is performed to determine whether the detection result of operations S900 through S940 is reliable, and if the verification result is negative, the process proceeds to operation S900 and performs a cell search. If the verification result is positive, the cell search process according to an embodiment of the present invention ends. For example, a corresponding to the scrambling code of the target cell is calculated, and if the calculated pilot correlation value is less than a predetermined threshold, the verification result is negative.

In particular, FIG. 26 is a flowchart corresponding to the embodiment B-2, and as described above, the embodiment B-1 in which operation S960 to perform the verification process is omitted for a quick cell search also exists. Though not shown in FIG. 26, it will be understood by those of ordinary skill in the art that a fine tuning operation for fine tuning frequency and timing can be further included after operation S940.

Figure 27:
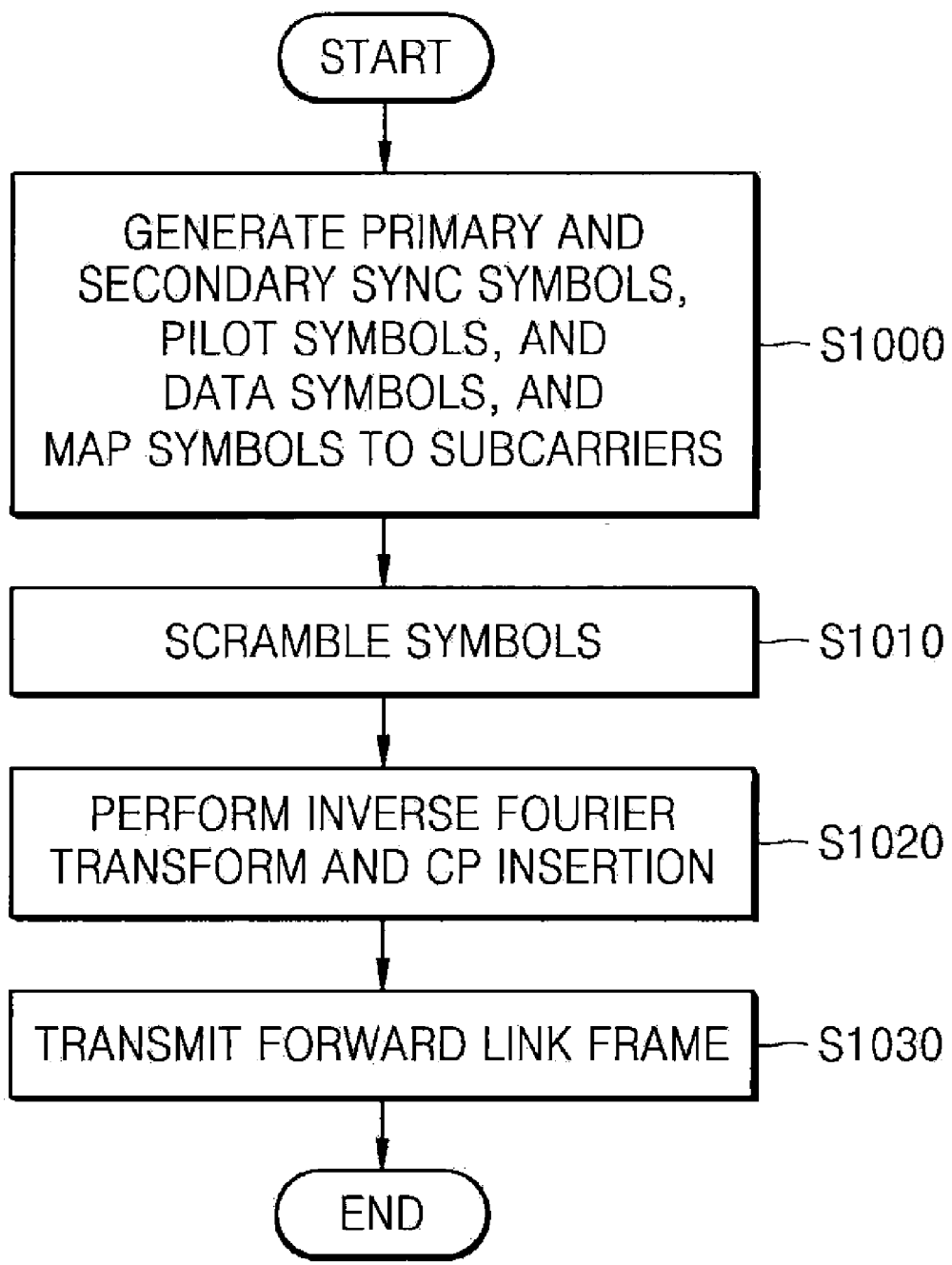
FIG. 27 is a flowchart illustrating a frame transmission method of a base station according to an embodiment of the present invention.

FIG. 27 is a flowchart illustrating a frame transmission method of a base station according to an embodiment of the present invention. Referring to FIG. 27, the base station's frame transmission method according to the current embodiment includes operations sequentially processed by the blocks of the frame transmission apparatus illustrated in FIG. 7. Thus, although not fully described, the contents described relating to the frame transmission apparatus illustrated in FIG. 7 also apply to the frame transmission method according to the current embodiment.

In operation S1000, the sync channel generator 400 generates sync channel chips corresponding to a hopping pattern of the base station, i.e., sync symbols. Simultaneously, the data channel generator 402 and the common pilot channel generator 401 generate data symbols and pilot symbols, respectively. The OFDM symbol mappers 404-A and 404-B map the generated sync symbols, data symbols, and pilot symbols to each subcarrier. Through this process, sync channel symbols are code-hopped according to sync channel sequences included in the hopping pattern.

Here, according to the embodiment A, the hopping pattern corresponds to a code group to which a scrambling code belongs, and according to the embodiment B, the hopping pattern corresponds to the scrambling code. In addition, an arbitrary hopping pattern used in the OFDM cellular system differs from a cyclically shifted result of the hopping pattern, other hopping patterns, or cyclically shifted results of the other hopping patterns.

In operation S1010, symbols that remain due to the exclusion of the sync channel symbols are scrambled in the frequency domain by the scramblers 405-A and 405-B.

In operation S1020, a forward link frame is generated by performing inverse Fourier transformation on each of the sync channel symbols and the scrambled remaining symbols in the inverse Fourier transformers 406-A and 406-B and inserting CPs into the forward link frame in the CP insertion units 407-A and 407-B.

In operation S1030, the generated forward link frame is transmitted through an RF channel by the IF/RF units 408-A and 408-B and the transmission antennas 409-A and 409-B.

The embodiments A and B of the present invention have been described. It will be understood by those of ordinary skill in the art that the embodiments A and B can be used for an initial cell search performed by a mobile station and also used for an adjacent cell search using the principle of the present invention. However, an efficient adjacent cell search method using the principle will now be suggested by assuming that an OFDM cellular system operating in the base station synchronous mode is used. Here, the OFDM cellular system operating in the base station synchronous mode indicates a synchronous OFDM cellular system.

A cellular system is divided into an asynchronous cellular system in which frame timings of all base stations are independent to each other and a synchronous cellular system in which frame timings of all base stations are synchronized and mapped to each other. An example of the asynchronous cellular system is a WCDMA system, and examples of the synchronous cellular system are an Interim Standard (IS)-95 system and a CDMA2000 system in which all base stations operate by being synchronized with Global Positioning System (GPS).

A 3G-LTE system basically uses an OFDM transmission method as a forward link transmission method. In this case, a timing difference between OFDM symbols of signals received from cells adjacent to a cell boundary must be less than a CP duration. Only if this condition is satisfied, orthogonality between subcarriers of the signals received from the adjacent cells is maintained. One of systems satisfying the condition is a synchronous OFDM cellular system. Since all base stations in the synchronous OFDM cellular system operate in the base station synchronous mode, frame boundaries (frame timings) of frames transmitted from each base station are matched to each other.

The cell search process performed in a cellular system includes the initial cell search process performed when a mobile station is turned on as described above and the adjacent cell search process for detecting frame timing and a scrambling code of an adjacent cell so as to perform handover in an idle or call mode after completing the initial cell search process.

In the idle or call mode, an error of the clock generator 440 illustrated in FIG. 10 is close to 0 since a frequency offset can be continuously estimated using a signal received from a home cell. Thus, in the adjacent cell search process, the frequency offset switching units 530-A and 530-B of FIG. 23 do not have to operate in the first detection step described above. In addition, frequency offset compensation in the frequency offset compensators 542, 552, 681-A, and 681-B illustrated in FIGS. 14, 15, and 21 does not have to be performed in the second and third detection steps, and an input signal bypasses to a next stage.

As described above, when an OFDM cellular system operates in a base station synchronous mode, the first detection step in an adjacent cell search process can be omitted. That is, since a frame boundary of a signal received from an adjacent cell is within an error range of a CP from a frame boundary of a home cell, the first detector 520 illustrated in FIG. 10 does not have to operate. That is, if an operation of the first detector 520 is described, the first detector 520 considers symbol synchronization of the home cell as symbol synchronization of the adjacent cell.

In order to support seamless handover, a mobile station must be able to perform the adjacent cell search process even when the intensity of reception signals from adjacent cells is equal to or less than the intensity of a reception signal from a home cell. That is, the mobile station must continuously measure the intensity of a reception signal of an adjacent cell (i.e., a reception signal received from the adjacent cell) in the idle or call mode and report the measurement result to a base station. In this case, if the base station operates in the base station synchronous mode, since a sync channel symbol transmitted from the base station of the home cell and a sync channel symbol transmitted from the base station of the adjacent cell overlap in the time domain, if the mobile station uses the second detection step, the cell search performance may be decreased.

To address this problem, in an adjacent cell search method of a mobile station according to an embodiment of the present invention, a home cell component cancellation block is further included next to the combiner 656 illustrated in FIG. 16 in the second detection step.

Figure 28:
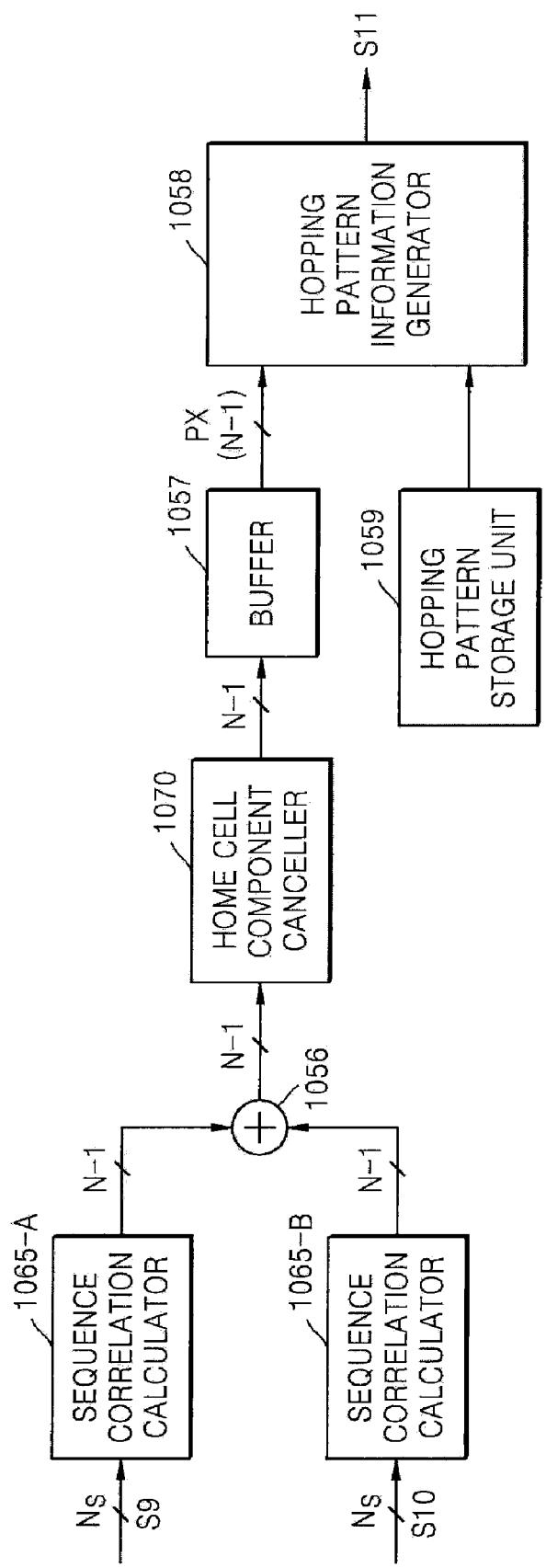
FIG. 28 is a block diagram of the second detector of the receiver illustrated in FIG. 10, according to another embodiment of the present invention.

FIG. 28 is a block diagram of the second detector 540 illustrated in FIG. 10, according to another embodiment of the present invention. Referring to FIG. 28, the second detector 540 further includes a home cell component canceller 1070 in addition to the configuration illustrated in FIG. 16.

Since functions and operations of sequence correlation calculators 1065-A and 1065-B, a combiner 1056, a buffer 1057, and a hopping pattern storage unit 1059 are the same as those of the sequence correlation calculators 665-A and 665-B, the combiner 656, the buffer 657, and the hopping pattern storage unit 659, a detailed description is omitted for convenience.

The home cell component canceller 1070 cancels a home cell component from the output of the combiner 1056. That is, the home cell component canceller 1070 replaces a sequence correlation value corresponding to a sync channel code sequence of a home cell among N−1 combined sequence correlation values by a predetermined number, e.g., 0. Since the mobile station has determined a hopping pattern of the home cell, the home cell component can be cancelled.

Figure 29:
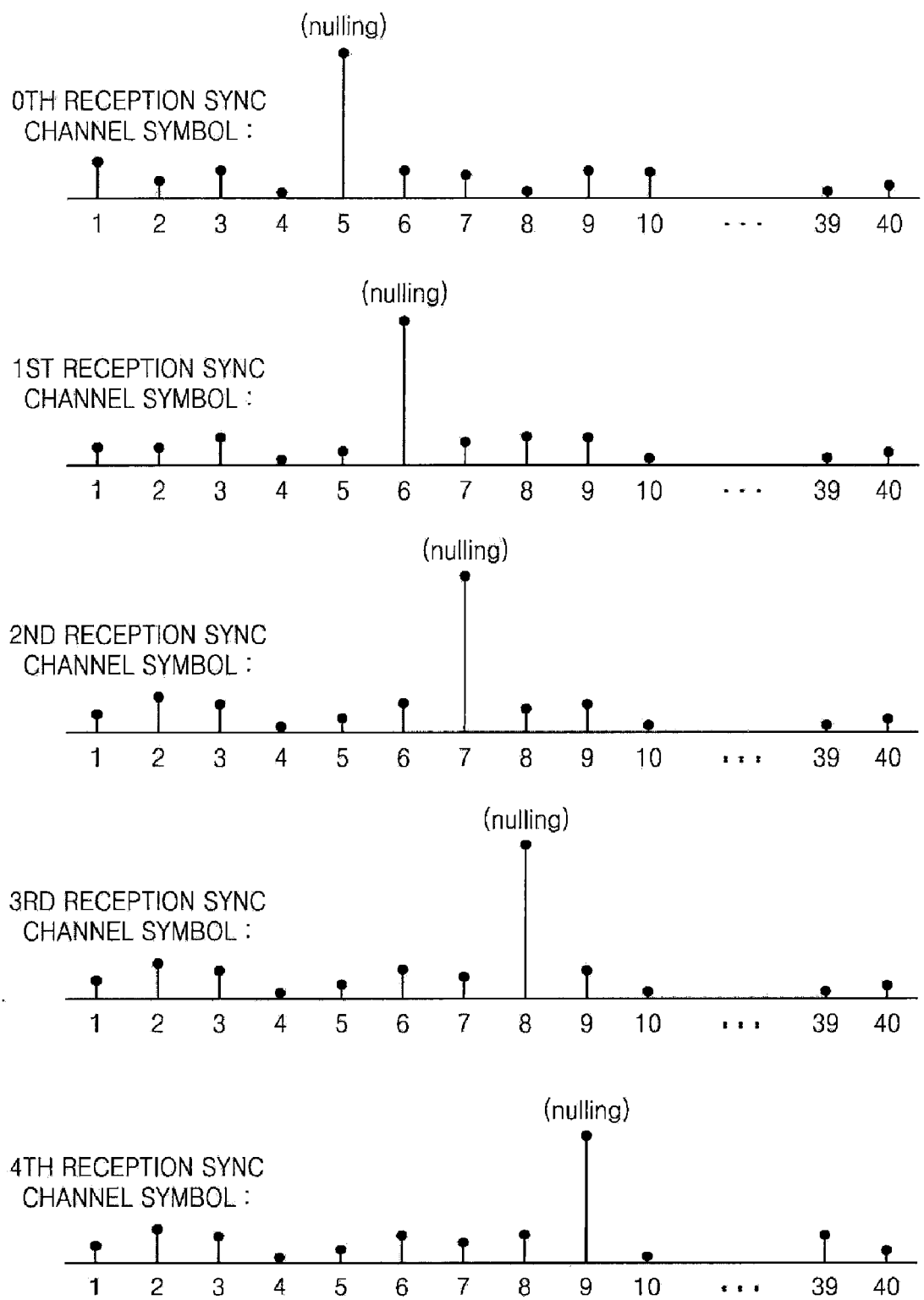

FIGS. 29 and 30 are diagrams for explaining an operation of the home cell component canceller 1070 illustrated in FIG. 28 according to an embodiment of the present invention.

FIG. 29 corresponds to an input of the home cell component canceller 1070. That is, FIG. 29 illustrates correlation results of all sync channel code sequences used in the system with respect to each of 5 reception sync channel symbols.

FIG. 29 shows a case where a hopping pattern of the home cell is (5, 6, 7, 8, 9). In this case, the home cell component canceller 1070 replaces sequence correlation values corresponding to (5, 6, 7, 8, 9) by 0.

FIG. 30 corresponds to an output of the home cell component canceller 1070. In FIG. 30, the sequence correlation values corresponding to (5, 6, 7, 8, 9), which are home cell components, are replaced by 0. Thus, the hopping pattern information generator 1058 detects one or more of hopping patterns that remain due to the exclusion of the hopping pattern of the home cell.

In the adjacent cell search process of a cellular system in which base stations operate in the base station synchronous mode, the hopping pattern information generator 1058 according to an embodiment of the present invention does not have to detect a cyclic shift index of an adjacent cell. As described above, since all base stations are matched to the frame sync, a frame timing of the adjacent cell is the same as a frame timing of the home cell. Thus, the hopping pattern information generator 1058 in the adjacent cell search process according to an embodiment of the present invention does not have to calculate all of P×$N_G$ hopping pattern correlation values in the cellular system in which base stations operate in the base station synchronous mode but calculates $N_G$ hopping pattern correlation values. Each hopping pattern correlation value is represented by Equation 17.

$$q(i) = \sum_{u=0}^{P-1} v_u(h_i(u)), \quad i = 0, 1, \ldots, N_G - 1 \tag{17}$$

When Equation 17 is compared to Equation 10, the number of hopping pattern correlation values is reduced by an amount 1/P. This is because a cyclic shift index does not have to be considered in the adjacent cell search process in the base station synchronous mode. The hopping pattern information generator 1058 calculates the $N_G$ hopping pattern correlation values obtained by Equation 17 and provides a hopping pattern correlation index corresponding to the maximum hopping pattern correlation value to a next stage as the hopping pattern information S11.

The third detection step in the base station synchronous mode is performed the same as the operation of the third detector 580 illustrated in FIG. 10 excluding non-compensation of a frequency offset.

Figure 31:
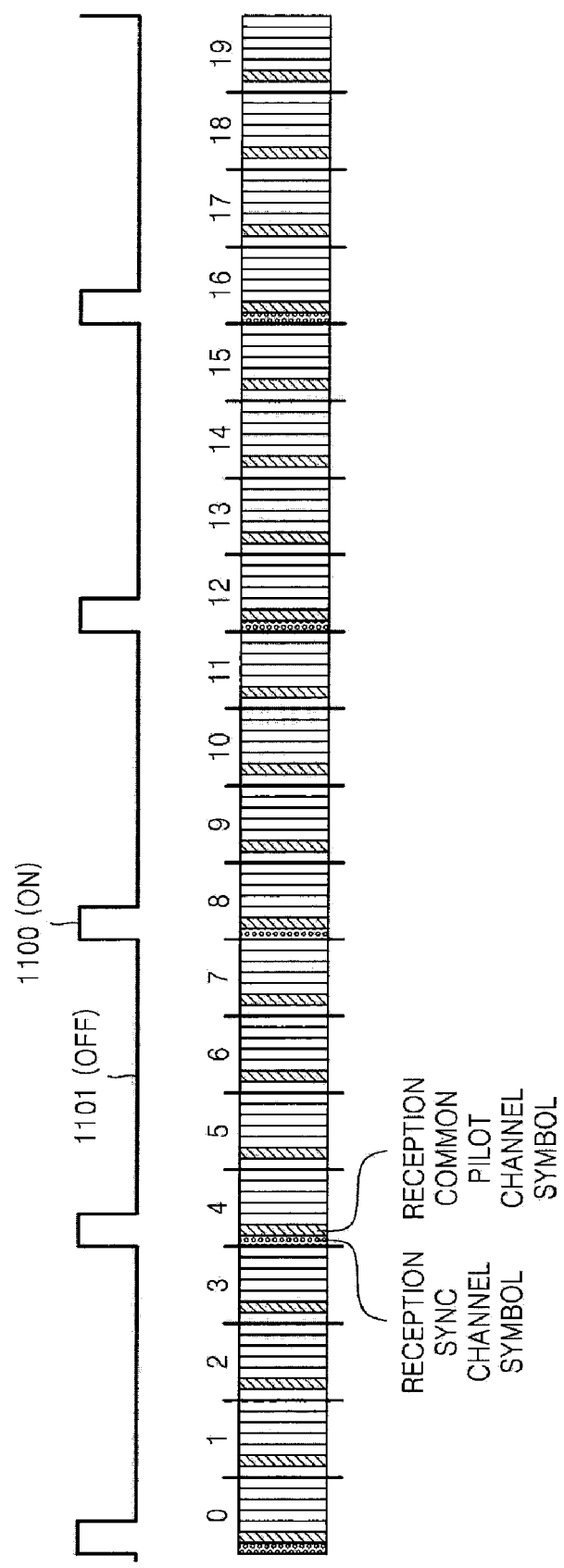
FIG. 31 is a diagram for explaining a gating mode of a mobile station performing an adjacent cell search process in an idle mode according to an embodiment of the present invention.

In a cellular system operating in the base station synchronous mode, when an adjacent cell is searched in the idle mode of a mobile station according to another embodiment of the present invention, in order to minimize power consumption of the mobile station, the mobile station uses a gating mode in which operations of the remainder blocks 410-A, 410-B, 500, 420, and 430 excluding the clock generator 440, which supports a frame clock synchronized with a frame boundary of a home cell, are turned on/off as illustrated in FIG. 31.

FIG. 31 is a diagram for explaining the gating mode of a mobile station performing the adjacent cell search process in the idle mode according to an embodiment of the present invention. Referring to FIG. 31, the mobile station's receiver searches an adjacent cell only during ON durations 1100 in which a reception sync channel symbol and a reception common pilot channel symbol exist and does not perform a reception operation of a receiver end, such as adjacent cell search or down conversion, during OFF durations 1101. That is, the mobile station can reduce battery consumption by performing a cell search only using signals received during the ON durations 1100.

Figure 32:
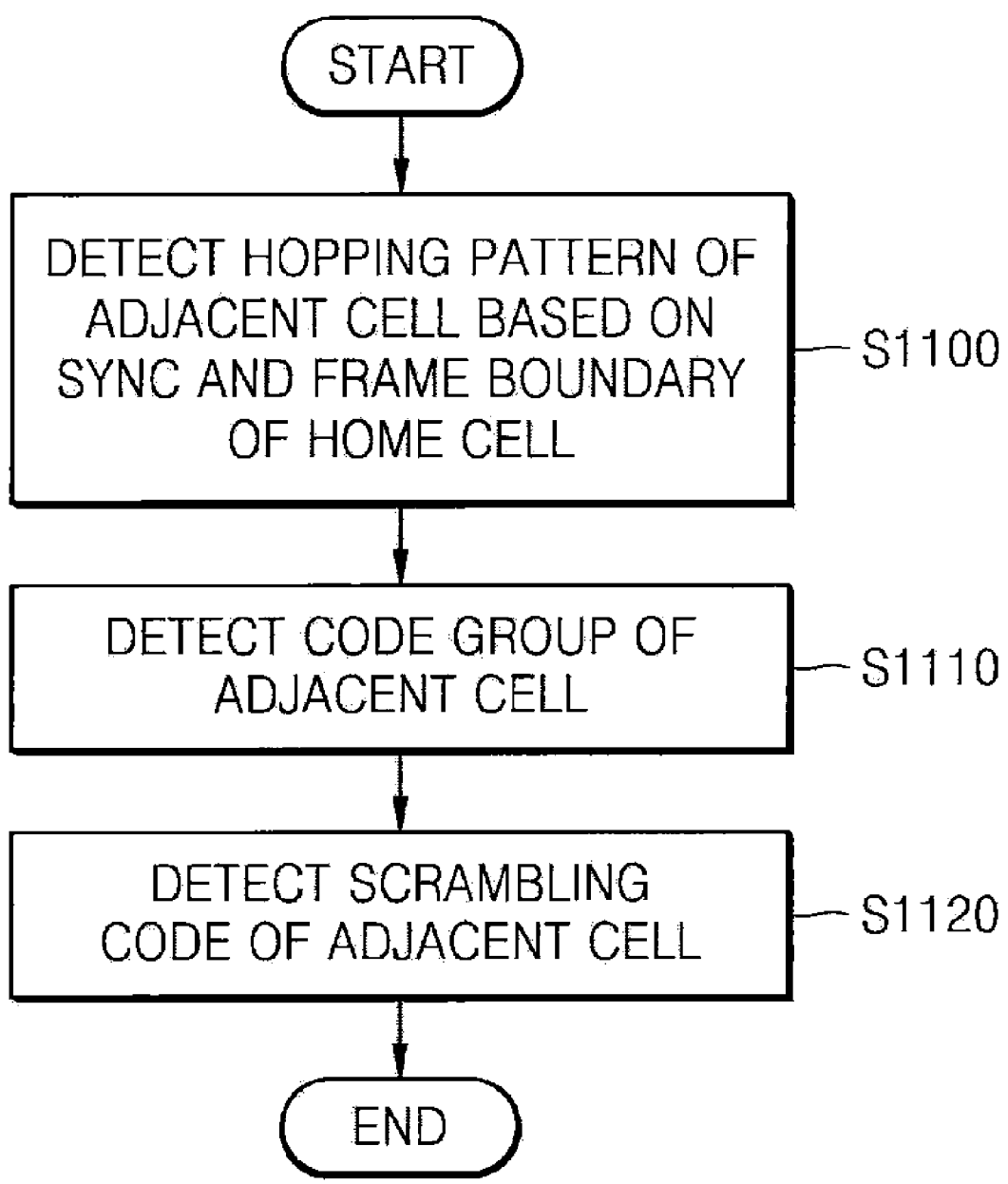
FIG. 32 is a flowchart illustrating an adjacent cell search method of a mobile station according to an embodiment of the present invention.

FIG. 32 is a flowchart illustrating an adjacent cell search method of a mobile station according to an embodiment of the present invention. Referring to FIG. 32, the mobile station's adjacent cell search method according to the current embodiment includes operations sequentially processed by the cell search unit 500 in the base station synchronous mode. Thus, although not fully described, the contents described relating to the cell search unit 500 illustrated in FIG. 10 and the second detector 540 illustrated in FIG. 28 also apply to the adjacent cell search method according to the current embodiment.

In operation S1100, the first detector 520 considers synchronization and a frame boundary of a home cell as synchronization and a frame boundary of an adjacent cell, and the second detector 540 detects a hopping pattern of the adjacent cell from reception sync channel symbols based on the synchronization and frame boundary of the adjacent cell.

In operation S1110, the second detector 540 detects a code group of the adjacent cell based on the detected hopping pattern.

In operation S1120, the third detector 580 detects a scrambling code of the adjacent cell based on the detected code group and a reception common pilot channel symbol.

The embodiment illustrated in FIG. 32 corresponds to a case where each hopping pattern respectively corresponds to each code group. If each hopping pattern respectively corresponds to each scrambling code, in operation S1110, the second detector 540 detects a scrambling code of the adjacent cell based on the detected hopping pattern, and operation S1120 does not have to be performed.

According to the present invention, in an OFDM cellular system, a cell search time of a mobile station can be reduced, and a cell search unit operating with low complexity can be implemented.

In addition, according to a sync acquisition method, synchronization can be acquired with low complexity. In addition, according to an adjacent cell search method, in an OFDM cellular system in which base stations are in a base station synchronous mode, an adjacent cell search process can be efficiently performed, and thus handover can be smoothly performed, and battery consumption of a mobile station can be reduced.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A cell search method used by a terminal to search a target cell using reception signals received from a plurality of base stations, each base station transmitting a frame of its cell, in an Orthogonal Frequency-Division Multiplexing (OFDM) cellular system comprising a plurality of cells to which a cell-specific scrambling code is assigned, wherein the terminal includes a cell search unit having data detectors, and the cell search method comprises:

detecting, by a data detector of the cell search unit, a hopping pattern of the target cell using reception sync channel symbols, which are signals corresponding to sync channel symbol positions of the reception signals, wherein the frame of each cell comprises M sync channel symbols code-hopped according to a hopping pattern of the cell, where M is a natural number equal to or greater than 2, each hopping pattern containing M sync channel code sequences and respectively corresponding to each code group to which a scrambling code of each cell belongs, and an arbitrary hopping pattern used in the OFDM cellular system differs from a cyclically shifted result of the hopping pattern, other hopping patterns, or cyclically shifted results of the other hopping patterns; and detecting, by a data detector of the cell search unit, a code group of the target cell based on the detected hopping pattern, wherein the frame of each cell is made up of M sync slots having the same time duration, and each sync channel symbol is located at the same position in each sync slot.

2. The cell search method of claim 1, further comprising detecting, by a data detector of the cell search unit, a frame boundary based on the detected hopping pattern.

3. The cell search method of claim 2, wherein the frame of each cell comprises at least one common pilot channel symbol scrambled with a scrambling code of the cell, wherein the cell search method further comprises calculating pilot correlation values indicating correlation values of a reception common pilot channel symbol, which is a signal corresponding to a common pilot channel symbol position from among the reception signal, and scrambling codes belonging to the detected code group and detecting a scrambling of the target cell based on the calculated pilot correlation values.

4. The cell search method of claim 1, wherein the detecting of the hopping pattern comprises:

calculating hopping pattern correlation values indicating correlation values of each hopping pattern used in the OFDM cellular system and cyclically shifted results of the hopping pattern and the reception sync channel symbols; and determining a hopping pattern corresponding to the maximum hopping pattern correlation value as a hopping pattern of the target cell.

5. The cell search method of claim 4, wherein the calculating of the hopping pattern correlation values comprises:

calculating sequence correlation values indicating correlation values of each sync channel code sequence used in the OFDM cellular system and the reception sync channel symbols; and calculating each hopping pattern correlation value by summing sequence correlation values corresponding to each hopping pattern correlation.

6. The cell search method of claim 1, wherein the sync channel code sequence is made up of sync channel chips generated based on a Generalized Chirp Like (GCL) sequence.

7. The cell search method of claim 5, wherein the sync channel code sequence is made up of sync channel chips generated based on a GCL sequence, wherein the calculating of the sequence correlation values comprises:
- extracting reception sync symbols from each reception sync channel symbol, each reception sync symbol being carried on a subcarrier on which a sync channel chip is carried from among subcarriers of each reception sync channel symbol; and
- multiplying a complex conjugate value of an odd-th reception sync symbol by a reception sync symbol adjacent to the odd-th reception sync symbol for every odd-th reception sync symbols of each reception sync channel symbol.

8. The cell search method of claim 5, wherein the calculating of the sequence correlation values comprises:
- if the terminal has a plurality of reception antennas and acquires a reception signal through each of the plurality of reception antennas, calculating sequence correlation values per antenna indicating correlation values of each sync channel code sequence and the reception sync channel symbols contained in the reception signal per antenna; and
- calculating the sequence correlation values by combining the sequence correlation values corresponding to the same sync channel code sequence of the plurality of reception antennas.

9. The cell search method of claim 1, wherein a sync channel symbol included in the frame of each cell contains sync channel chips mapped to subcarriers positioning at every predetermined period in a sync channel occupied band and predetermined symbols mapped to the remainder subcarriers of the sync channel occupied band,
wherein the cell search method further comprises acquiring symbol synchronization using a time domain repetition pattern of each sync channel symbol contained in the reception signal.

10. The cell search method of claim 9, wherein the sync channel symbol included in the frame of each cell contains sync channel chips mapped to odd-th or even-th subcarriers of a sync channel occupied band and predetermined symbols mapped to the remainder subcarriers of the sync channel occupied band,
wherein the cell search method further comprises acquiring symbol synchronization using a time domain repetition pattern of each sync channel symbol contained in the reception signal.

11. The cell search method of claim 9, wherein the predetermined symbols are null symbols.

12. The cell search method of claim 10, wherein the acquiring of the symbol synchronization comprises:
- calculating differential correlation values of sample positions of the reception signal; and
- acquiring the symbol synchronization by determining a sample position corresponding to the maximum differential correlation value as a sync channel symbol timing.

13. The cell search method of claim 12, wherein the calculating differential correlation values comprises:
- if the terminal has a plurality of reception antennas and acquires a reception signal through each of the plurality of reception antennas, calculating differential correlation values per antenna indicating differential correlation values of sample positions of the reception signal per antenna; and
- combining the differential sequence correlation values per antenna corresponding to the same sample position, wherein the acquiring of the symbol synchronization by determining a sync channel symbol timing comprises determining a sync channel symbol timing based on the combining result.

14. The cell search method of claim 12,
wherein the calculating differential correlation values comprises:
- calculating differential correlation values per sync slot indicating differential correlation values of sample positions in sync slots; and
- combining the differential sequence correlation values per sync slot corresponding to sample positions having the same relative sample position in each sync slot, wherein the acquiring of the symbol synchronization by determining a sync channel symbol timing comprises determining a sync channel symbol timing based on the combining result.

15. The cell search method of claim 10, wherein the detecting of the hopping pattern comprises:
- estimating a frequency offset using at least one of the reception sync channel symbols;
- compensating for a frequency offset of each of the reception sync channel symbols based on the estimated frequency offset; and
- detecting the hopping pattern based on the compensated reception sync channel symbols.

16. The cell search method of claim 9, further comprising performing filtering to pass only the sync channel occupied band with respect to the reception signal,
wherein the acquiring of the symbol synchronization and the detecting of the hopping pattern respectively comprise acquiring the symbol synchronization and detecting the hopping pattern using the filtered reception signal.

17. The cell search method of claim 9, wherein the acquiring of the symbol synchronization is performed after frequency offset compensating for the reception signal by changing a frequency offset in each unit symbol sync acquisition duration.

18. The cell search method of claim 3, wherein a sync channel symbol included in the frame of each cell contains sync channel chips mapped to subcarriers positioning at every predetermined period in a sync channel occupied band and predetermined symbols mapped to the remainder subcarriers of the sync channel occupied band,
wherein the cell search method further comprises:
- acquiring symbol synchronization using a time domain repetition pattern of each sync channel symbol contained in the reception signal; and
- performing verification of an acquisition result of the acquiring of the symbol synchronization, a detection result of the detecting of the code group, a detection result of the detecting of the frame boundary, and a detection result of the detecting of the scrambling code, based on a result obtained by comparing a pilot correlation value corresponding to the detected scrambling code to a predetermined threshold.

19. The cell search method of claim 18, wherein if a verification result of the performing of the verification is negative, the acquiring of the symbol synchronization, the detecting of the code group, the detecting of the frame boundary, and the detecting of the scrambling code are performed again.

20. The cell search method of claim 2, wherein a sync channel symbol included in the frame of each cell contains sync channel chips mapped to subcarriers positioning at every predetermined period in a sync channel occupied band and predetermined symbols mapped to the remainder subcarriers of the sync channel occupied band,
wherein the cell search method further comprises acquiring symbol synchronization using a time domain repetition pattern of each sync channel symbol contained in the reception signal.

* * * * *